US011490053B2

(12) United States Patent
Sugimoto et al.

(10) Patent No.: US 11,490,053 B2
(45) Date of Patent: Nov. 1, 2022

(54) WORK INSTRUCTION SYSTEM AND IMAGE PROCESSING APPARATUS

(71) Applicant: Ricoh Company, Ltd., Tokyo (JP)

(72) Inventors: Hideki Sugimoto, Kanagawa (JP); Akihiro Matsuoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 221 days.

(21) Appl. No.: 16/921,215

(22) Filed: Jul. 6, 2020

(65) Prior Publication Data

US 2020/0336703 A1 Oct. 22, 2020

Related U.S. Application Data

(62) Division of application No. 15/169,001, filed on May 31, 2016, now abandoned.

(30) Foreign Application Priority Data

Jun. 2, 2015 (JP) ................................. 2015-111834
May 19, 2016 (JP) ................................. 2016-100295

(51) Int. Cl.
*G05B 19/418* (2006.01)
*H04N 7/18* (2006.01)
(Continued)

(52) U.S. Cl.
CPC ................ *H04N 7/18* (2013.01); *B33Y 50/00* (2014.12); *G05B 19/41805* (2013.01);
(Continued)

(58) Field of Classification Search
CPC .... H04N 7/18; H04N 5/2253; H04N 5/23225; B33Y 50/00; G05B 19/41805;
(Continued)

(56) References Cited

U.S. PATENT DOCUMENTS 5,801,946 A 9/1998 Nissen
6,224,385 B1 5/2001 Nitta
(Continued)

FOREIGN PATENT DOCUMENTS

CN 203228002 U 10/2013
CN 103733153 A 4/2014
(Continued)

OTHER PUBLICATIONS

A. Majumder, "Image processing algorithms for improved character recognition and components inspection," 2009 World Congress on Nature & Biologically Inspired Computing (NaBIC), 2009, pp. 531-536 (Year: 2009).*

(Continued)

*Primary Examiner* — Christopher E. Everett
(74) *Attorney, Agent, or Firm* — Xsensus LLP

(57) ABSTRACT

A system for outputting a work instruction, in which an image processing device that takes a picture of a photographic subject is connected to an output device is disclosed. The system includes an imaging unit that generates image data showing the picture of the photographic subject; an obtaining unit that obtains determination data used for determining whether a work process performed on the photographic subject is completed; an input unit that inputs reference material data indicating reference materials used for reference in the work process; a determination unit that determines whether the work process performed on the photographic subject is completed, the determination being made depending on whether the photographic subject in the image data is in a state indicated by the determination data; and an output unit that outputs, to the output device, reference material data for a work process specified in accordance with the determination.

18 Claims, 17 Drawing Sheets

(51) Int. Cl.
  *G06K 9/62*       (2022.01)
  *B33Y 50/00*      (2015.01)
(52) U.S. Cl.
  CPC .. *G06K 9/6253* (2013.01); *G05B 2219/31027* (2013.01); *G05B 2219/31034* (2013.01); *G05B 2219/31039* (2013.01); *G05B 2219/31046* (2013.01); *G05B 2219/31047* (2013.01); *G05B 2219/31062* (2013.01); *G06V 2201/06* (2022.01)
(58) Field of Classification Search
  CPC ........... G05B 2219/31027; G05B 2219/31034; G05B 2219/31039; G05B 2219/31046; G05B 2219/31047; G05B 2219/31062; G05B 19/042; G06K 9/6253; G06V 2201/06
  See application file for complete search history.

(56) References Cited

U.S. PATENT DOCUMENTS

| | | | |
|---|---|---|---|
| 6,345,207 | B1 | 2/2002 | Nitta |
| 7,650,982 | B2 | 1/2010 | Tachibana |
| 9,053,363 | B1 | 6/2015 | Nordstrom |
| 9,329,594 | B2 | 5/2016 | Rataul |
| 2004/0225390 | A1* | 11/2004 | Keller ................... G06Q 10/06 700/95 |
| 2008/0121168 | A1* | 5/2008 | Ryznar ............. G05B 19/41805 116/202 |
| 2009/0055741 | A1 | 2/2009 | Maeda et al. |
| 2009/0198365 | A1* | 8/2009 | Seaman ........... G05B 19/41805 700/116 |
| 2009/0199396 | A1 | 8/2009 | Shelley et al. |
| 2012/0075343 | A1* | 3/2012 | Chen .................... G06T 19/006 345/633 |
| 2013/0144416 | A1* | 6/2013 | Rataul .............. G05B 19/41865 700/95 |
| 2013/0325155 | A1 | 12/2013 | Ryznar |
| 2014/0350708 | A1 | 11/2014 | Kobayashi |
| 2015/0125835 | A1 | 5/2015 | Wittich |
| 2016/0012361 | A1 | 1/2016 | Sugiyama |
| 2016/0171772 | A1* | 6/2016 | Ryznar .................. G09G 5/006 345/633 |
| 2017/0132554 | A1 | 5/2017 | Oonishi |

FOREIGN PATENT DOCUMENTS

| | | |
|---|---|---|
| JP | H05-183294 | 7/1993 |
| JP | 7-270329 A | 10/1995 |
| JP | 2002-328716 | 11/2002 |
| JP | 2006-127309 A | 5/2006 |
| JP | 2006-172387 A | 6/2006 |
| JP | 2007-301679 | 11/2007 |
| JP | 2008-203922 | 9/2008 |
| JP | 2009-25951 A | 2/2009 |
| JP | 2009-37392 A | 2/2009 |
| JP | 2009-289046 A | 12/2009 |
| JP | 2010-218002 A | 9/2010 |
| JP | 2011-145809 A | 7/2011 |
| JP | 2013-003773 | 1/2013 |
| JP | 2015-89586 A | 5/2015 |

OTHER PUBLICATIONS

Combined Office Action and Search Report dated Sep. 19, 2018 in Chinese Patent Application No. 201610371365.4 (with English translation).
Office Action dated Oct. 8, 2019, in corresponding Japanese Patent Application No. 2016-100295, 19 pages.
Office Action dated Mar. 31, 2020 in corresponding Japanese Patent Application No. 2016-100295, 3 pages.
Japanese Office Action dated Sep. 23, 2020 in Japanese Patent Application No. 2016-100295, 3 pages.

* cited by examiner

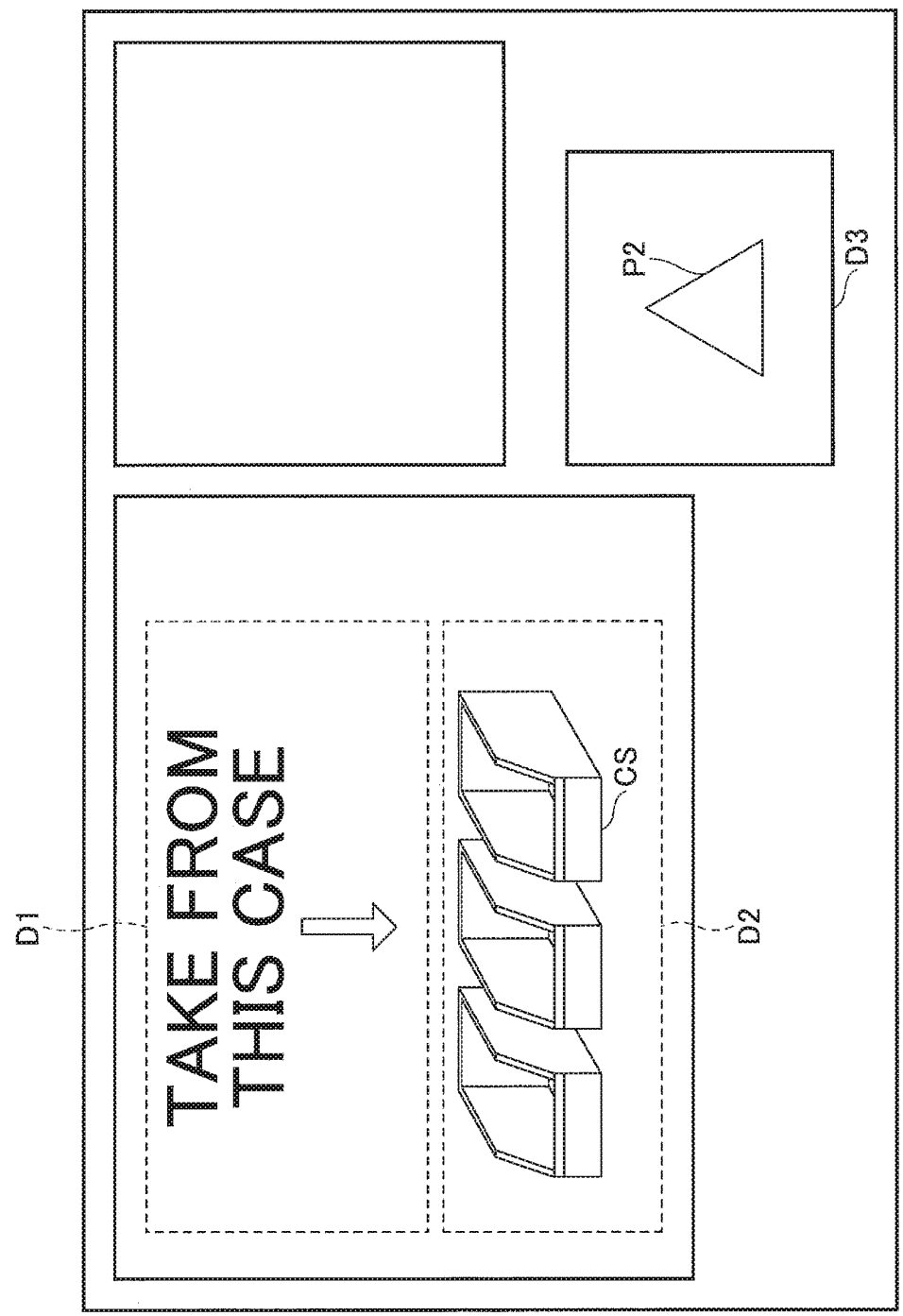

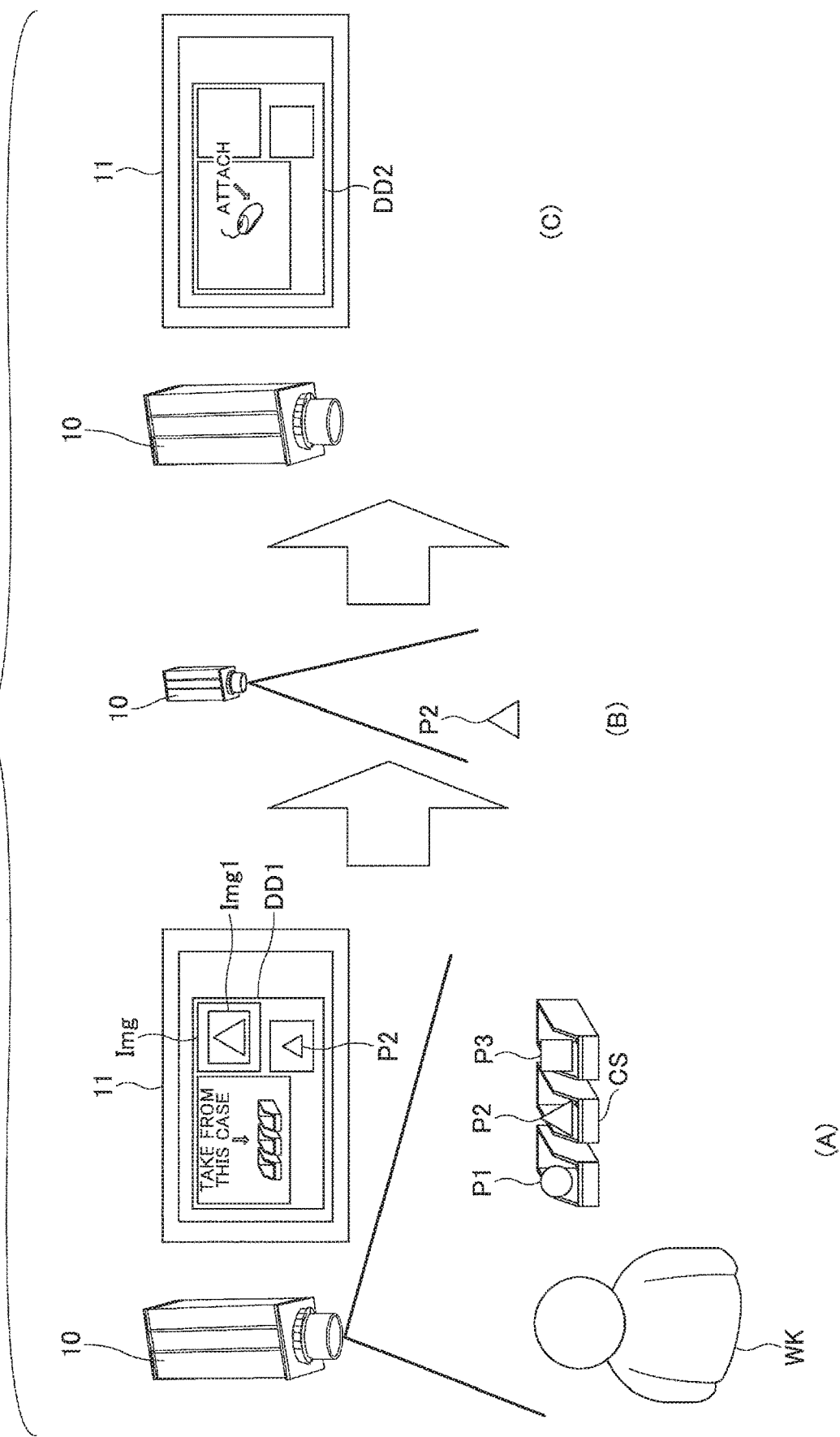

FIG. 7

| No. | WORK PROCESS | WORK ITEM | DATE | TIME | WORKING TIME | PERSON IN CHARGE | REGISTERED NAME | REGISTERED NUMBER | IMAGE |
|---|---|---|---|---|---|---|---|---|---|
| 1 | REGISTRATION OF PROCESS NUMBER | REGISTER PROCESS NUMBER | 2014/11/11 | 10:12:14 | 0:00:01 | **** | PROCESS NUMBER | A051xxxx | |
| 2 | ASSEMBLY OF BOTTOM UNIT | INSTALL LENS | 2014/11/11 | 10:12:17 | 0:00:03 | **** | | | |
| 3 | ASSEMBLY OF BOTTOM UNIT | REGISTER PCB S/N | 2014/11/11 | 10:12:17 | 0:00:03 | **** | PCB | C142xxxx | |
| 4 | ASSEMBLY OF BOTTOM UNIT | INSTALL PCB | 2014/11/11 | 10:12:32 | 0:00:15 | **** | | | |
| 5 | ASSEMBLY OF BOTTOM UNIT | IDENTIFY HARNESS | 2014/11/11 | 10:12:36 | 0:00:04 | **** | | | ▣ |
| 6 | ASSEMBLY OF BOTTOM UNIT | INSTALL HARNESS | 2014/11/11 | 10:13:46 | 0:01:10 | **** | | | |
| 7 | ASSEMBLY OF TOP COVER | IDENTIFY WHEEL | 2014/11/11 | 10:13:50 | 0:00:04 | **** | | | ▣ |
| 8 | ASSEMBLY OF TOP COVER | INSTALL WHEEL | 2014/11/11 | 10:14:01 | 0:00:11 | **** | | | |
| 9 | ASSEMBLY OF MAIN BODY | INSTALL TOP COVER | 2014/11/11 | 10:14:17 | 0:00:16 | **** | | | |
| 10 | ASSEMBLY OF MAIN BODY | SCREW TOP COVER | 2014/11/11 | 10:14:25 | 0:00:08 | **** | | | |
| 11 | ASSEMBLY OF MAIN BODY | DETECT LABEL NUMBER | 2014/11/11 | 10:14:28 | 0:00:03 | **** | PRODUCT LABEL | A051xxxx | |
| 12 | ASSEMBLY OF MAIN BODY | ATTACH LABEL | 2014/11/11 | 10:14:34 | 0:00:06 | **** | | | |
| 13 | INSPECTION OF FINISHED PRODUCT | INSPECT FUNCTION | 2014/11/11 | 10:14:55 | 0:00:21 | **** | | | |
| 14 | INSPECTION OF FINISHED PRODUCT | CHECK APPEARANCE | 2014/11/11 | 10:15:05 | 0:00:10 | **** | | | ▣ |
| 15 | PACKAGING | ASSEMBLE PACKAGING BOX | 2014/11/11 | 10:15:13 | 0:00:08 | **** | | | |
| 16 | PACKAGING | IDENTIFY OPERATION MANUAL | 2014/11/11 | 10:15:16 | 0:00:03 | **** | | | |
| 17 | PACKAGING | IDENTIFY BUNDLED CD | 2014/11/11 | 10:15:19 | 0:00:03 | **** | | | |
| 18 | PACKAGING | PACKAGE ENTIRE PART | 2014/11/11 | 10:15:29 | 0:00:10 | **** | | | |
| 19 | PACKAGING | ATTACH PACKAGING LABEL | 2014/11/11 | 10:15:34 | 0:00:05 | **** | PACKAGING LABEL | A051xxxx | |
| 20 | SHIPMENT | SHIP | 2014/11/11 | 10:15:47 | 0:00:18 | **** | | | ▣ |

FIG.8

WORKING TIME
(MINUTE: SECOND)

| Work Process Name | Time |
|---|---|
| REGISTER PROCESS NUMBER | 0:01 |
| INSTALL LENS | 0:03 |
| REGISTER PCB S/N | 0:03 |
| INSTALL PCB | 0:15 |
| IDENTIFY HARNESS | 0:04 |
| INSTALL HARNESS | 1:10 |
| IDENTIFY WHEEL | 0:04 |
| INSTALL WHEEL | 0:11 |
| INSTALL TOP COVER | 0:16 |
| SCREW TOP COVER | 0:08 |
| DETECT LABEL NUMBER | 0:03 |
| ATTACH LABEL | 0:06 |
| INSPECT FUNCTION | 0:21 |
| CHECK APPEARANCE | 0:10 |
| ASSEMBLE PACKAGING BOX | 0:08 |
| IDENTIFY OPERATION MANUAL | 0:03 |
| IDENTIFY BUNDLED CD | 0:03 |
| PACKAGE ENTIRE PART | 0:10 |
| ATTACH PACKAGING LABEL | 0:05 |
| SHIP | 0:18 |

WORK INSTRUCTION SYSTEM AND IMAGE PROCESSING APPARATUS

CROSS-REFERENCE TO RELATED APPLICATIONS

The present application is a divisional application of U.S. application Ser. No. 15/169,001, filed May 31, 2016, which is based on claims the benefit of priorities of Japanese Priority Application No. 2015-111834 filed on Jun. 2, 2015 and Japanese Priority Application No. 2016-100295 filed on May 19, 2016, the entire contents of which are incorporated herein by reference.

BACKGROUND OF THE INVENTION

1. Field of the Invention

The present invention relates to a work instruction system and an image processing apparatus.

2. Description of the Related Art

There are methods for managing operations performed by workers in a process of manufacturing a device.

Further, there are methods in management of operations. A worker wears a headset first, then when the worker operates a button of PHS included in the headset, instructions are issued to the worker through voice sound by audio guidance or display on a display screen of a work instruction terminal (Patent Document 1, for example).

However, in these methods, workers or the like (hereafter simply referred to as a "worker") that perform a work process such as installing parts in a product in a factory or the like are required to determine and report on their own the work process that is currently performed by the workers. Accordingly, if the work process performed by the worker is erroneous or the worker fails to perform an operation to report the work process, for example, reference materials such as work instructions prepared for a work process to be performed may not be output.

RELATED ART DOCUMENTS

[Patent Document 1] Japanese Laid-Open Patent Application No. 2002-328716

SUMMARY OF THE INVENTION

It is an object of at least one embodiment of the present invention to provide a work instruction system capable of outputting reference materials such as work instructions for a work process to be performed.

In an embodiment, a system for outputting a work instruction is provided, in which an image processing device that takes a picture of a photographic subject is connected to an output device. The system includes an imaging unit that generates image data showing the picture of the photographic subject; an obtaining unit that obtains determination data used for determination of whether a work process performed on the photographic subject is completed; an input unit that inputs reference material data indicating reference materials used for reference in the work process; a determination unit that determines whether the work process performed on the photographic subject is completed, the determination being made depending on whether the photographic subject in the image data is in a state indicated by the determination data; and an output unit that outputs, to the output device, reference material data for a work process specified in accordance with the determination.

BRIEF DESCRIPTION OF THE DRAWINGS

Other objects and further features of embodiments will become apparent from the following detailed description when read in conjunction with the accompanying drawings, in which:

FIG. 5 is a diagram depicting reference material data according to an embodiment;

FIG. 6 is a diagram depicting a result of an overall process by a work instruction system according to an embodiment;

FIG. 7 is a diagram depicting work record data generated by a work instruction system according to an embodiment;

FIG. 8 is a diagram depicting an analysis using working times according to an embodiment;

DESCRIPTION OF THE PREFERRED EMBODIMENTS

Figure 1:
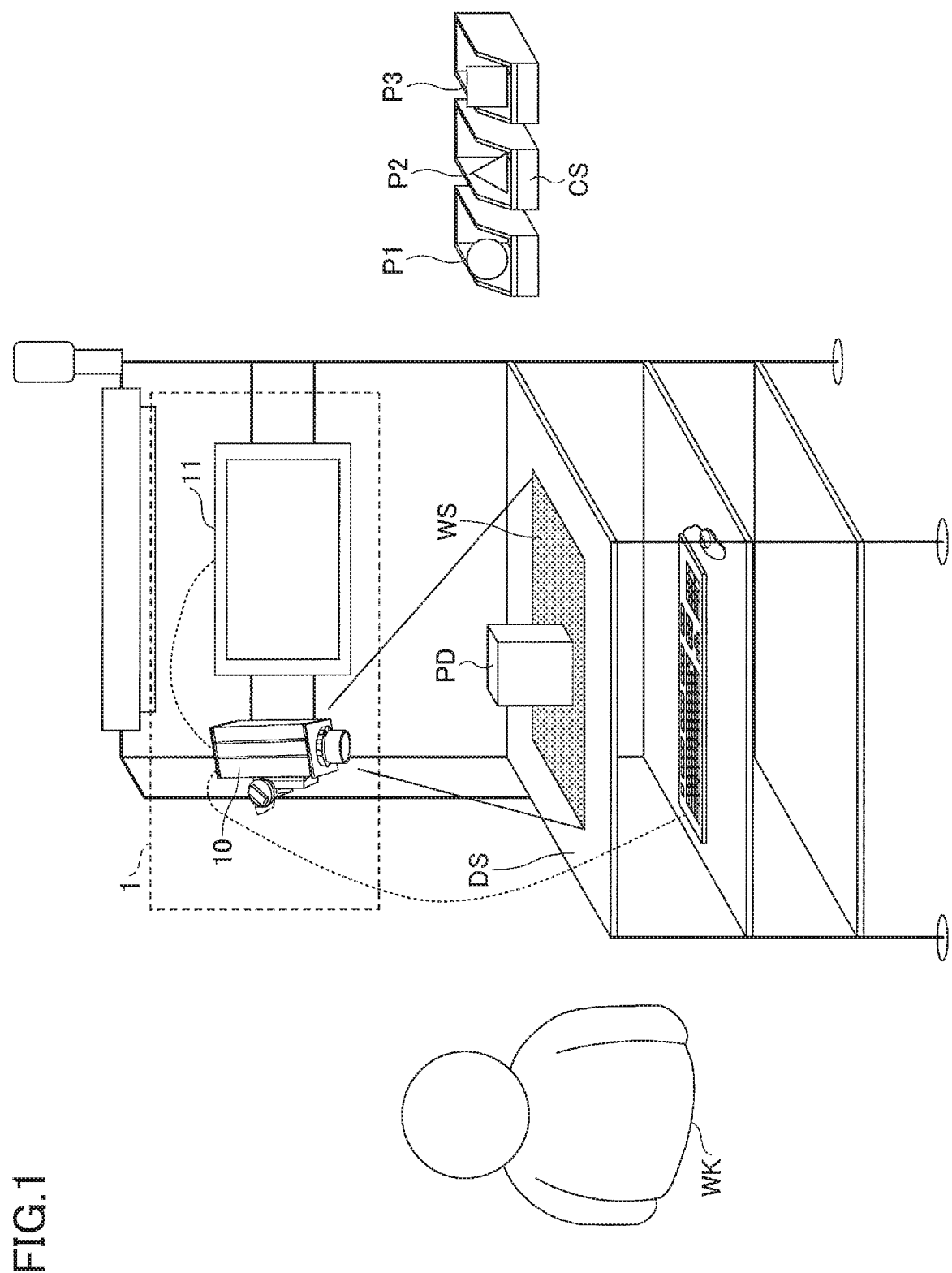
FIG. 1 is a diagram of an overall structure depicting usage of a work instruction system according to an embodiment.

In the following, embodiments of the present invention will be described with reference to the accompanying drawings. In the Specification and the drawings, constituent elements having substantively the same functional configuration are given the same reference numeral and a repetitive description will be omitted.

First Embodiment

<Overall Structure>

First, usage of a work instruction system according to the first embodiment is described and an overall structure of the work instruction system is described.

FIG. 1 is a diagram of the overall structure depicting the usage of the work instruction system according to the first embodiment. Specifically, FIG. 1 shows a case where a worker WK performs a work process to install parts on a workbench DS in a factory, for example. In the following example, as depicted in the drawings, the worker WK performs the work process to install parts in a product PD upon manufacturing the product PD. In this example of the work process, the worker WK is supposed to install, in the product PD, a first part P1, a second part P2, and a third part P3, all of which are put in a case CS placed on the workbench DS or placed in proximity to the workbench DS. In addition, examples of the parts include electronic parts for an electronic circuit board or the like, mechanism parts such as screws, washers, springs, or spacers, and labels.

A work instruction system 1 includes a camera 10 which is an example of an image processing device, and a monitor 11 which is an example of an output device. Further, the camera 10 and the monitor 11 are connected via a High-Definition Multimedia Interface (HDMI) (registered trademark) cable or the like and the monitor 11 displays an image, for example, based on an output from the camera 10.

The camera 10 is mounted to be able to take a picture of a work space on the workbench DS. Specifically, the camera 10 is set at an angle such that an optical axis of the camera 10 is perpendicular to a surface of the workbench DS as depicted in FIG. 1. This is an example where the camera 10 is located in a position such that the camera 10 can look down to be able to take a picture of a work process performed by the worker WK. In other words, the camera 10 is positioned such that the camera 10 can take a picture of a work space WS where the worker WK performs a work process on the product PD.

Further, the monitor 11 is disposed above the workbench DS or the like as shown in FIG. 1 and the worker WK can see reference materials displayed on the monitor 11.

In addition, an input device such as a keyboard and a mouse may be connected to the camera 10 via a Universal Serial Bus (USB) cable, for example, as shown in FIG. 1. In other words, the worker WK may operate the work instruction system 1 using the input device.

Further, a Local Area Network (LAN) cable or the like may be connected to the camera 10 and the camera 10 may be connected to a network. In other words, the camera 10 may be connected to an information processing device such as a server via the network and the camera 10 may transmit and receive data to and from the server via the network.

In addition, the camera 10 may be connected to the network via a wireless LAN or the like.

<Hardware Configuration>

Figure 2:
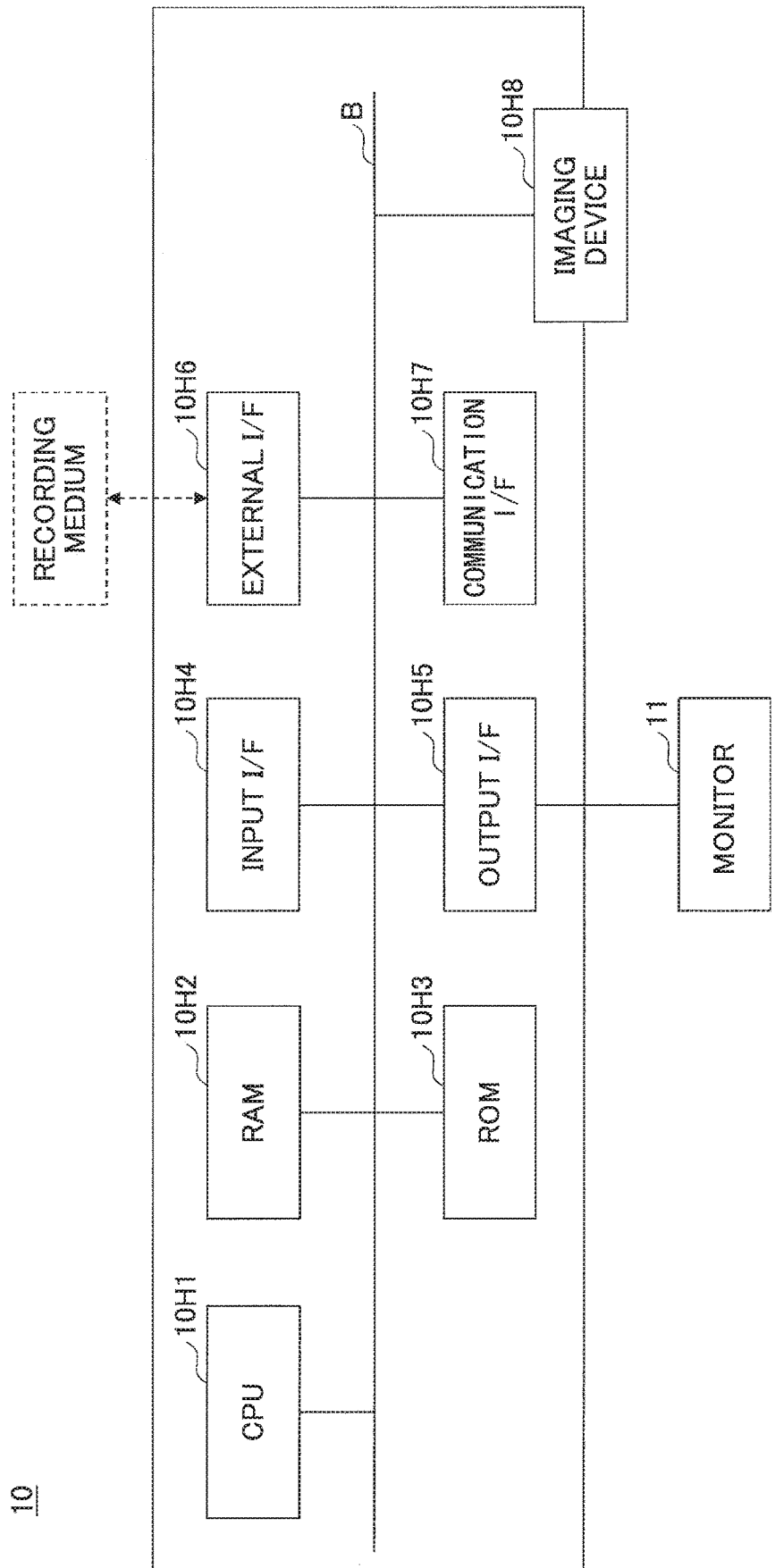
FIG. 2 is a block diagram depicting a hardware configuration of an image processing device according to an embodiment.

FIG. 2 is a block diagram depicting a hardware configuration of an image processing device according to the embodiment. As shown in FIG. 2, the camera 10 includes a Central Processing Unit (CPU) 10H1, a Random Access Memory (RAM) 10H2, a Read Only Memory (ROM) 10H3, an input interface (I/F) 10H4, an output I/F 10H5, an external I/F 10H6, a communication I/F 10H7, and an imaging device 10H8. These hardware units included in the camera 10 are connected via a bus B.

The CPU 10H1 includes an arithmetic unit that performs an arithmetical operation and data processing related to various types of processing performed by the camera 10 and includes a control device that controls hardware units included in the camera 10. In addition, the CPU 10H1 may be a Field-Programmable Gate Array (FPGA) or an Application Specific Integrated Circuit (ASIC). Further, the CPU 10H1 may include a plurality of arithmetic units and control devices.

The RAM 10H2 includes what is called a memory that stores a program and data. The RAM 10H2 is an example of a main storage. In contrast, the ROM 10H3 includes a non-volatile memory (storage device) that can store a program and data even if a power supply is switched off. In addition, the camera 10 may further include an auxiliary storage such as a hard disk.

The input I/F 10H4 includes a connector and a processing Integrated Circuit (IC), for example. An input device such as a keyboard or a mouse is connected to the input I/F 10H4 via a cable, for example.

The output I/F 10H5 includes a connector and a processing IC, for example. An output device such as the monitor 11 is connected to the output I/F 10H5 via a cable, for example. In addition, the camera 10 may include an input device, an output device, or an input/output device.

The external I/F 10H6 includes a connector or the like for connecting an external device such as a recording medium. Examples of the recording medium include a USB memory, an SD (registered trademark) memory card, a CD, and a DVD.

The communication I/F 10H7 includes an interface such as a connector or an antenna that performs data communication with an information processing device or the like via a network.

The imaging device 10H8 includes an optical system and an image processing IC for taking a picture and generating image data, for example. Specifically, the optical system includes an optical sensor, a lens, a filter, and the like. The imaging device 10H8 may be a stereo camera having a plurality of optical systems.

In addition, the work instruction system 1 may further include one information processing device or more. In other words, the camera 10 may be a network camera and the camera 10 may transmit image data to the information processing device connected via a network, and the information processing device may perform all or part of various types of processing. In addition, the image processing device may be configured with a plurality of devices and all or part of processing may be performed in a redundant, parallel, or dispersed manner.

<Overall Process>

Figure 3:
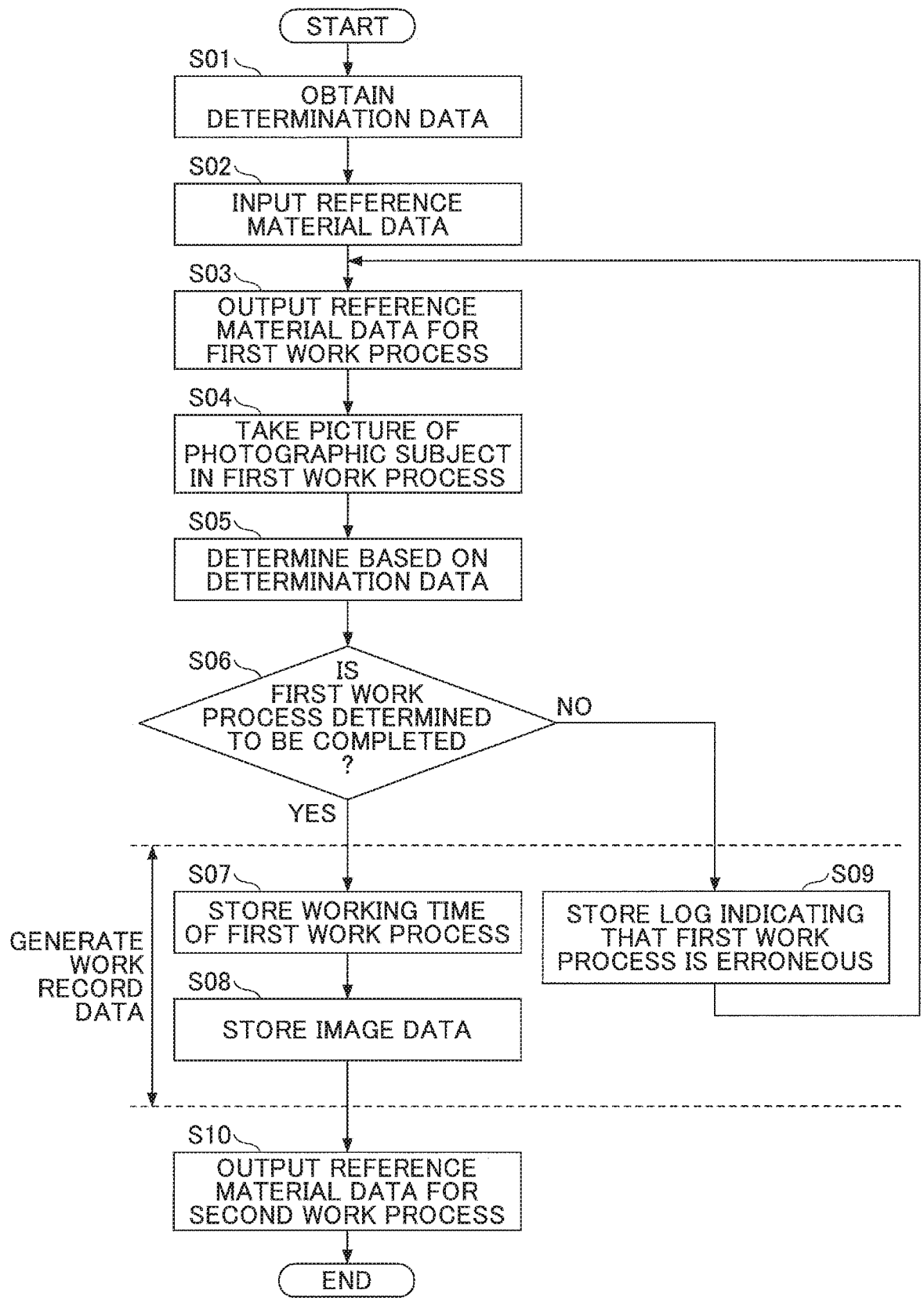
FIG. 3 is a flowchart depicting an overall process by a work instruction system according to an embodiment.

FIG. 3 is a flowchart depicting an overall process performed by the work instruction system 1 according to the embodiment. In FIG. 3, the work instruction system 1 performs the overall process in which a worker WK performs a first work process and a second work process that follows the first work process. In addition, step S01 and step S02 are processes related to preparation in the overall process. Step S01 and step S02 are performed before the worker WK performs the work processes. Processes from step S03 are performed while the worker WK performs the work processes.

<Obtaining Determination Data (Step S01)>

The camera 10 obtains determination data. The determination data indicates a color, a type, a shape of a product or a part, the number of products or parts to be installed in work processes, positions at which the parts are installed, or a combination thereof.

Figure 4:
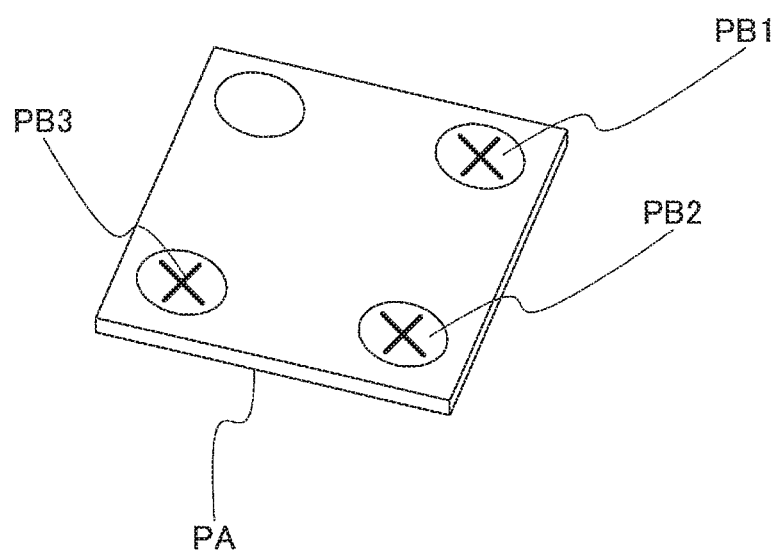
FIG. 4 is a diagram depicting determination data according to an embodiment.

FIG. 4 is a diagram depicting determination data according to the embodiment. For example, in work processes, three parts including a first screw PB1, a second screw PB2, and a third screw PB3 are installed on a metal plate PA. In this example, the worker WK installs the three parts including the first screw PB1, the second screw PB2, and the third screw PB3 on corresponding positions shown in FIG. 4. In the work processes, the camera 10 determines whether each of the screws that are used has a color, a type, and a shape specified in the work instructions.

For example, when the color is determined, the determination data includes a color name, RGB values, or the like that indicates the color of the screw specified in the work instructions. Further, when the type or the shape is determined, the determination data includes an image, three-dimensional data, or the like that indicates the screw in the work instructions. Further, when the number of parts to be installed is determined, the determination data includes the number of screws, namely, data indicating a value of "3." Further, when the position of installation is determined, the determination data includes an image of the part installed according to the work instructions, coordinate data, or the like that indicates a position at which a corresponding screw is to be installed.

Further, if a part to be determined is a label, the determination data includes a color of a label, a shape of the label, characters, numbers, a figure, a symbol, or an image written on the label, or text or an image that indicates a combination thereof.

<Input of Reference Material Data (Step S02)>

Returning to FIG. 3, reference material data is input into the camera 10. The reference material data includes work instructions of each work process, namely, work content of each work process, an image that shows a product or a part to be used in each work process, an image that shows a state where the part is installed on the product, work order by which each work process is performed, or a combination thereof. Further, the reference material data includes data to be output to the monitor 11 in a later stage of the process.

FIG. 5 is a diagram depicting reference material data according to the embodiment. In the following example, the first work process is to take out the second part P2. In this example, the reference material data includes work instructions related to the work process to take out the second part P2. Specifically, as depicted in FIG. 5, the work instructions indicate information such as work content with characters "Take out second part P2," or an image showing a location where the second part P2 is placed and an outer shape of the second part P2.

In FIG. 5, the work content is displayed with work content data D1 that indicates characters and a symbol. Further, in FIG. 5, the location where the second part P2 is placed is displayed with image data D2 that indicates a case CS. Further, in FIG. 5, the outer shape of the second part P2 is displayed with image data D3 that indicates the second part P2.

In addition, the reference material data may be different depending on content of each work process. Accordingly, the reference material data is not limited to the configuration shown in FIG. 5. For example, a movie, voice sound, a design drawing, or the like may further be used.

<Output of Reference Material Data for First Work Process (Step S03)>

Returning to FIG. 3, the camera 10 outputs, to the monitor 11, reference material data that indicates the first work process from the reference material data input in step S02. Next, the monitor 11 displays work instructions or the like based on the output reference material data.

<Taking Picture of Photographic Subject in First Work Process (Step S04)>

The camera 10 takes a picture of a photographic subject on the work space WS (FIG. 1) and generates image data.

<Determination Based on Determination Data (Step S05)>

The camera 10 performs determination based on determination data. Specifically, the determination is realized through image processing such as pattern matching. For example, in the first work process for taking out the second part P2, the camera 10 determines whether a part held by the worker WK matches a part indicated by the determination data through the pattern matching. In this example, the determination data includes an image that indicates the second part P2.

Specifically, the camera 10 compares image data obtained by taking a picture of the part held by the worker WK with the determination data, and determines that the part that has been taken out is the second part P2 if a degree of similarity is a threshold value or more. In other words, in this case, if the second part P2 is taken out by the worker WK, the camera 10 determines that the first work process is completed.

<Determination of Whether First Work Process is Completed (Step S06)>

The camera 10 determines whether the first work process is completed. Specifically, if the second part P2 is taken out in the first work process, the camera 10 determines that the first work process is completed in step S05. In this case, the camera determines that the first work process is completed (YES in step S06), and the process of the camera 10 proceeds to step S07.

In contrast, if the first part P1, for example, which is different from the second part P2 is taken out in the first work process, the camera 10 determines that the first work process is not completed in step S05. In this case, the camera 10 determines that the first work process is not completed (NO in step S06), and the process of the camera 10 proceeds to step S09. In addition, in step S06, if completion is not determined for a certain period of time, the camera 10 may determine that the first work process is not completed (NO in step S06).

When some work process is performed in the first work process, the camera 10 generates work record data as in steps S07 to S09, for example. Specifically, if the second part P2 is taken out in the first work process, the performed work process is specified by the work instructions, namely, a correct work process (hereafter "correct work process"). In contrast, if the first part P1, for example, which is different from the second part P2 is taken out in the first work process, the performed work process is different from what is specified by the work instructions, namely, an erroneous work process such as a careless mistake (hereafter "erroneous work process").

In step S05, the camera 10 determines whether a correct work process is performed or an erroneous work process is performed. Then, if the correct work process is performed (YES in step S06), the process of the camera 10 proceeds to step S07 and step S08. In contrast, if the erroneous work process is performed, (NO in step S06), the process of the camera 10 proceeds to step S09.

<Storing Working Time of First Work Process (Step S07)>

The camera 10 stores a working time of the first work process. Specifically, the working time of the first work process indicates a period from a time when the reference materials for the first work process are output (step S03) to a time when it is determined that the first work process is completed (step S05), for example. In other words, the camera measures, with a counter or a timer, a time from step S03 to step S05 and stores the measured time as a working time of the first work process.

Each working time is used to analyze a work process in time study (JIS Z 8141:2001), for example. Specifically, stored working times are averaged, for example, to calculate a standard time of each work process.

Further, each working time may be used for display of a countdown from the standard time or bar display that indicates elapsed time in which the standard time is represented as 100%. When each working time is used in this manner, it is possible to perform progress management of the worker WK or to determine a pace of the work process.

<Storing Image Data (Step S08)>

The camera 10 stores image data. In other words, the camera 10 stores a result of a performed work process as an image. In accordance with this, the camera 10 can store an important work process or the like as an image.

<Storing Log Indicating that First Work Process is Erroneous (Step S09)>

The camera 10 stores a log that indicates that the first work process is erroneous. For example, image data or the like to indicate a part erroneously taken out is stored as a log in order to indicate how the work process went wrong. In accordance with this, it is possible to store data to analyze parts or work processes that are likely to result in an error.

<Output of Reference Material Data for Second Work Process (Step S10)>

The camera 10 outputs, to the monitor 11, reference material data that indicates the second work process that follows the first work process.

In addition, the overall process is not limited to the process depicted in FIG. 3. For example, step S01 and step S03 may be performed in reverse order or may be performed in parallel. Further, the overall process may deal with another work process other than the first work process and the second work process and may deal with three work processes or more.

<Process Result>

FIG. 6 is a diagram depicting a result of an overall process by a work instruction system according to the embodiment. First, before a work process starts, the camera 10 obtains determination data (step S01 in FIG. 3) and inputs reference material data (step S02 in FIG. 3).

When the work process starts, the camera 10 outputs first work process reference material data DD1 to the monitor 11 as in FIG. 6-(A), for example (step S03 in FIG. 3). The first work process reference material data DD1 includes an image and the like that indicate work content and the second part P2 as depicted in FIG. 6-(A). In particular, when the image that indicates the second part P2 is displayed on the monitor 11, even if there is another part that has an outer shape that resembles the outer shape of the second part P2, the worker WK is likely to confirm the second part P2 visually. Accordingly, the camera 10 can reduce a possibility that the worker WK will take out the other part different from the second part P2 by mistake. In other words, when a part to be used in each work process is displayed, the worker WK can see the part to be used in the work process. Accordingly, even if there is a similar part, it is possible to reduce an event where the worker WK uses the similar part by mistake in the work process. Further, even if the worker WK is less experienced, the worker WK can reduce an error of selection of a part to be used in the work process.

Further, the first work process reference material data DD1 may include an image that indicates a completed work state where the second part P2 is installed, for example. In other words, the first work process reference material data DD1 may include an assembly drawing where the second part P2 is installed.

Accordingly, when the first work process reference material data DD1 is displayed as in FIG. 6-(A), the worker WK can see the monitor 11 and confirm that the first work process is to take out the second part P2 from the case CS. In accordance with this, the worker WK performs the work process to take out the second part P2 from the case CS. Meanwhile, the camera 10 takes an image of how the work process is performed (step S04 in FIG. 3). In addition, obtained image data may be displayed as a current image Img as depicted in FIG. 6-(A), for example. Further, the current image Img is preferably displayed in real time.

Then the camera 10 determines whether the obtained image data includes a part indicated by the determination data as in FIG. 6-(B) (step S05 in FIG. 3). In this example, the determination data includes image data that indicates the second part P2. If the obtained image data includes the second part P2 as a photographic subject, the camera 10 determines that the second part P2 is taken out (YES in step S06 in FIG. 3).

If the second part P2 is taken out by the worker WK, the first work process is completed, so that the camera 10 generates work record data (step S07 and step S08 in FIG. 3).

Next, the camera 10 outputs second work process reference material data DD2 to the monitor 11 as in FIG. 6-(C), for example (step S10 in FIG. 3). When the second work process reference material data DD2 is displayed, the worker WK can see the monitor 11 and confirm that the second work process is to attach the second part P2 taken out in the first work process.

As described above, the camera 10 can determine whether each work process performed by the worker WK is a correct work process or an erroneous work process based on the determination data.

In addition, the camera 10 may output a determination result. For example, the camera 10 outputs, as the determination result, an enclosure line Img1 to indicate the determined second part P2 on the displayed current image Img as depicted in FIG. 6-(A). When the enclosure line Img1 is displayed, the worker WK can confirm that the second part P2 that has been taken out is determined by the camera 10, and so a correct work process is performed. Further, when the camera 10 determines the second part P2, the camera 10 may output a predetermined sound as a determination result. When the predetermined sound is output, the worker WK can confirm that the second part P2 that has been taken out is determined by the camera 10, and so a correct work process is performed.

If it is not determined that the first work process is completed, the second work process reference material data DD2 is not output to the monitor 11. Accordingly, if the worker WK has performed an erroneous work process, the worker WK can confirm that the performed work process is an erroneous work process.

<Work Record Data>

FIG. 7 is a diagram depicting work record data generated by the work instruction system 1 according to the embodiment. As depicted in FIG. 7, the work record data DW includes data about each work process. Specifically, a "working time" is recorded for a corresponding "work process" (step S07 in FIG. 3). In accordance with this, it is possible to confirm the working time required in each work process. For example, as depicted in FIG. 7, the working time is measured as working time data DT that indicates the working time for a corresponding "work process" and is included in the work record data DW.

FIG. 8 is a diagram depicting an analysis using working times according to the embodiment. An analysis diagram DA depicted in FIG. 8 shows a result of the analysis of each work process using a corresponding working time. As depicted in FIG. 8, when the analysis diagram DA is used, it is readily possible to make an analysis of work processes such as determination of unevenness of working times and determination of a work process among performed work processes that most requires a working time (bottleneck process, for example). In addition, all or part of the work record data DW may be transmitted to a server or the like via a network, for example.

Further, as depicted in FIG. 7, the work record data DW may include a "work item" that indicates work content, a "date" and "time" that indicates date and time when each work process is performed, a "person in charge" that indicates the name of a worker WK that performed each work process, and the like.

The structure and the form of the work record data DW are not limited to those depicted in FIG. 7. For example, each item may be included in separate data.

Further, as depicted in FIG. 7, the work record data DW may include image data DImg (step S08 in FIG. 3). For example, the work record data DW may include image data on the current image Img depicted in FIG. 6-(A) as the image data DImg. In accordance with this, the camera 10 can store a result of each work process as an image.

Further, the camera 10 may recognize characters, numbers, a figure, a symbol, a bar code, or a two-dimensional code included in a photographic subject, the shape of a part, or a combination thereof and may include identification data DSN for identifying the part in the work record data DW. In addition, the identification data DSN may be numbers, such as a serial number, a production number, identification (ID), or the like that can identify each part. For example, the camera 10 reads a bar code written on a product or a part to be handled in a work process. Then the camera 10 performs bar code recognition to obtain a serial number that corresponds to the read bar code, and generates the identification data DSN that indicates the serial number. Further, the camera 10 includes the generated identification data DSN in the work record data DW.

The camera 10 may generate the identification data DSN through Optical Character Recognition (OCR) or the like.

When the identification data DSN is included in the work record data DW, the work instruction system 1 records a serial number or the like that indicates a part used in a work process and can identify each part installed on a product. In other words, traceability is realized by the camera through recording the serial number or the like.

Further, in work processes, a plurality of parts may be used. In this case, the camera 10 may determine whether each part is installed, whether the parts are installed in order specified in the work instructions, and whether the parts are installed at corresponding positions specified in the work instructions.

Figure 9:
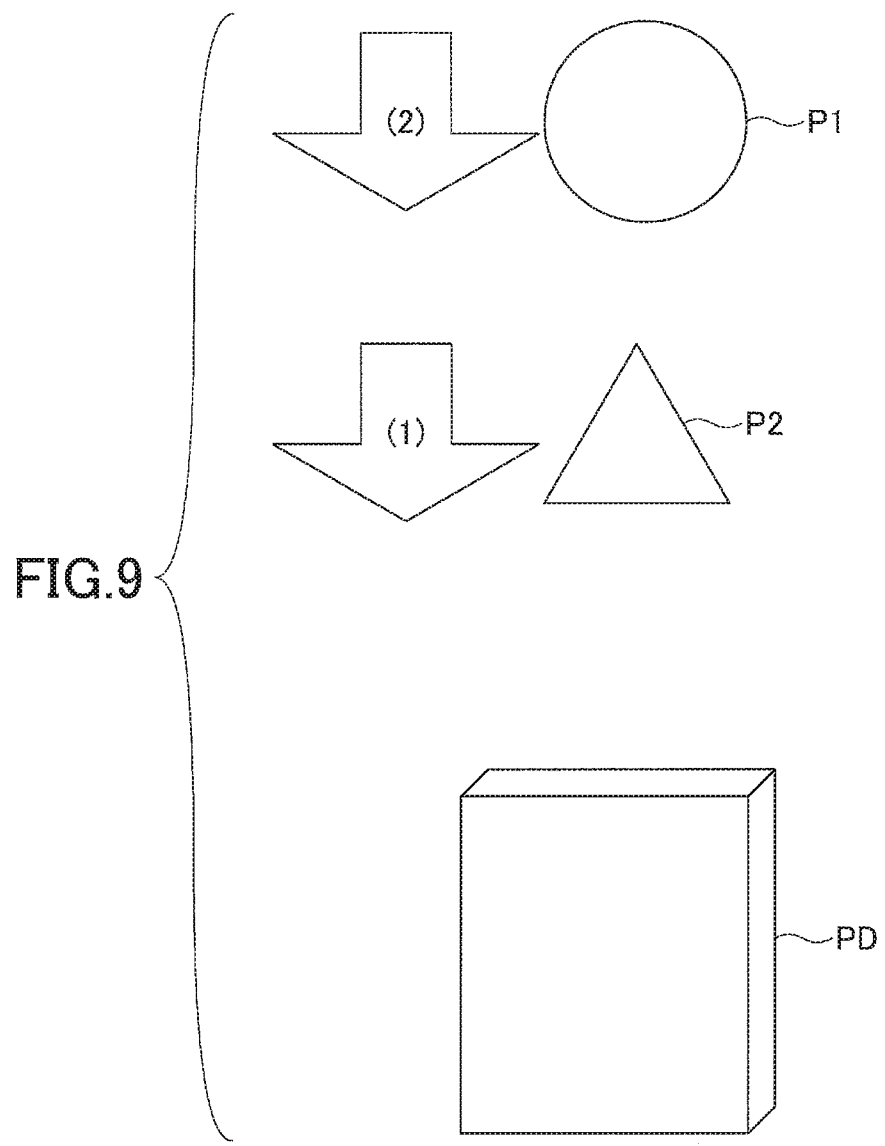
FIG. 9 is a diagram depicting a case where an image processing device according to an embodiment determines a work process that uses a plurality of parts.

FIG. 9 is a diagram depicting a case where the image processing device according to the embodiment determines a work process that uses a plurality of parts. For example, it is assumed that in the work process, the second part P2 is installed first and the first part P1 is installed next on a product PD in this work order as depicted in FIG. 9.

For example, in the work process depicted in FIG. 9, whether the second part P2 and the first part P1 are both installed is checked. Further, in the work process depicted in FIG. 9, whether the work process has been performed in work order by which the second part P2 is installed before the first part P1 is checked. Further, in the work process depicted in FIG. 9, whether the first part P1 is installed at a position such that the first part P1 is overlaid on the second part P2 is checked.

In step S05 depicted in FIG. 3, the camera first determines whether the second part P2 is installed and then determines whether the first part P1 is installed, for example.

According to such determination, if the worker WK has installed the first part P1 before the second part P2 by mistake, the camera 10 determines that an erroneous work process is performed (NO in step S06 in FIG. 3). In accordance with this, the camera 10 can check whether installation is performed in order as specified in the work instructions.

Further, according to such determination, if the camera 10 cannot determine that both the first part P1 and the second part P2 are included, the camera 10 determines that an erroneous work process is performed (NO in step S06 in FIG. 3). In accordance with this, whether the second part P2 and the first part P1 are both installed is checked. Accordingly, it is possible to reduce what is called a careless mistake where the worker WK forgets to install the second part P2 by mistake, for example.

Further, according to such determination, if the camera 10 cannot determine that the first part P1 is positioned such that the first part P1 is overlaid on the second part P2, the camera 10 determines that an erroneous work process is performed (NO in step S06 in FIG. 3). In accordance with this, whether the first part P1 is installed at the position such that the first part P1 is overlaid on the second part P2 is checked. Accordingly, it is possible to reduce a careless mistake where the worker WK installs the second part P2 at a position by mistake such that the second part P2 is overlaid on the first part P1, for example.

In addition, the camera 10 may check a work process to tighten a screw, for example. In this case, the camera 10 determines positions at which screws are installed and the number of installed screws, for example. If the positions at which the screws are installed are checked, the camera 10 can check whether the screws are installed at positions specified in the work instructions and can reduce a mistake where a screw is erroneously installed at an inappropriate position. Further, if the number of screws is checked, the camera 10 can check whether the screws are installed as many as the number specified in the work instructions. Accordingly, it is possible to reduce a mistake where a screw is not tightened by mistake or an excessive number of screws are erroneously installed. Further, other types of work processes, parts, and products may be used.

Further, characters or the like written on parts may be further determined.

Figure 10:
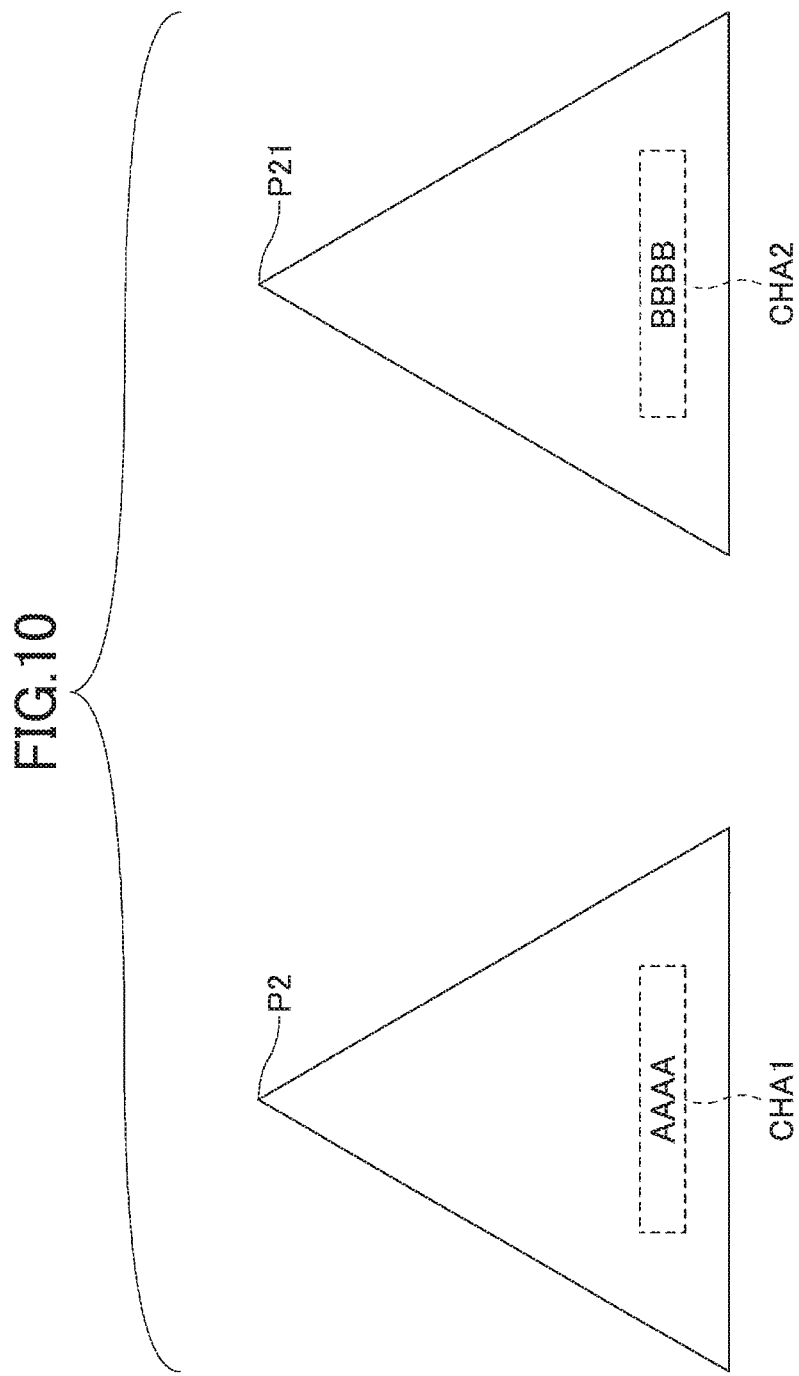
FIG. 10 is a diagram depicting a case where an image processing device according to an embodiment determines characters or the like written on parts.

FIG. 10 is a diagram depicting a case where the image processing device according to the embodiment determines characters or the like written on parts. For example, a work process uses the second part P2 and a similar part P21 different from the second part P2, the similar part P21 having the same outer shape as in the second part P2 or a similar outer shape as depicted in FIG. 10. Further, as depicted in FIG. 10, it is assumed that first characters CHA1 "AAAA" are written on the second part P2 while second characters CHA2 "BBBB" different from the first characters CHA1 are written on the similar part P21.

In this example, the camera 10 may determine the outer shapes of the parts and further determine whether characters written on the parts are first characters CHA1. As depicted in FIG. 10, if the second part P2 and the similar part P21 are both used in the work process, the worker WK may easily confuse these parts in particular and is likely to make a mistake of taking out a wrong part in a work process of taking out, for example. In contrast, if the camera 10 determines characters or the like written on parts, whether a part to be used is the second part P2 or the similar part P21 is checked.

In other words, if the camera 10 determines characters or the like written on parts, it is possible to reduce a mistake of using a wrong part even if there are similar parts in particular.

<Functional Configuration>

Figure 11:
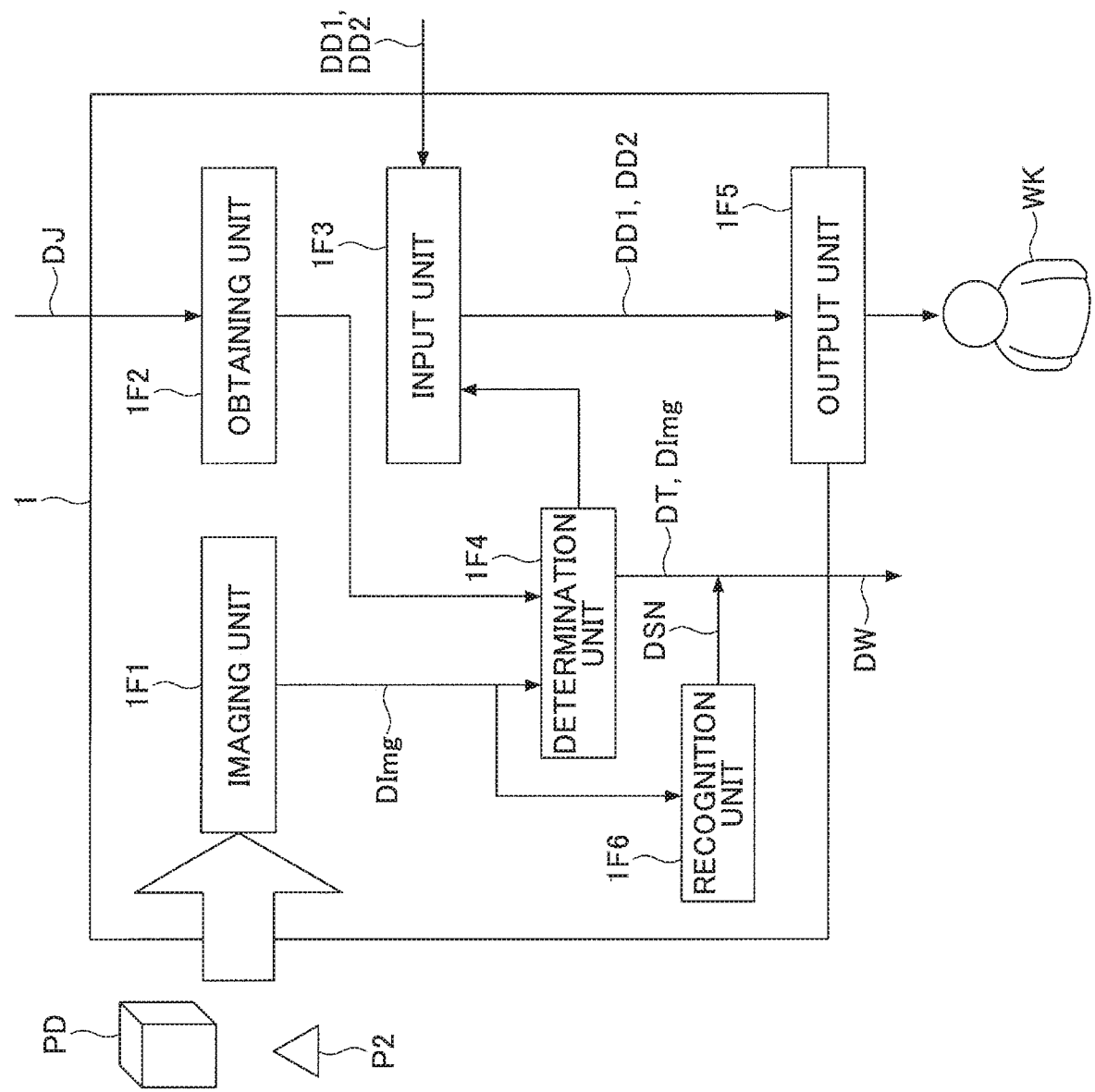
FIG. 11 is a functional block diagram depicting a functional configuration of a work instruction system according to an embodiment.

FIG. 11 is a functional block diagram depicting the functional configuration of the work instruction system 1 according to the embodiment. Specifically, the work instruction system 1 includes an imaging unit 1F1, an obtaining unit 1F2, an input unit 1F3, a determination unit 1F4, an output unit 1F5, and a recognition unit 1F6.

The imaging unit 1F1 takes a picture of the product PD, parts such as the second part P2, and a peripheral portion thereof as a photographic subject and generates image data DImg. The imaging unit 1F1 is implemented with the imaging device 10H8 (FIG. 2), for example.

The obtaining unit 1F2 obtains determination data DJ for a work process. In addition, the obtaining unit 1F2 is implemented with the input I/F 10H4 (FIG. 2), the external I/F 10H6 (FIG. 2), the communication I/F 10H7 (FIG. 2), the imaging device 10H8, or the like.

The input unit 1F3 inputs reference material data such as the first work process reference material data DD1 and the second work process reference material data DD2 to be used for a work process. In addition, the input unit 1F3 is implemented with the input I/F 10H4, the external I/F 10H6, the communication I/F 10H7, or the like.

The determination unit 1F4 determines whether a photographic subject indicated by the image data DImg is in a state or includes an object indicated by the determination data DJ. In addition, the determination unit 1F4 is implemented with the CPU 10H1 (FIG. 2) or the like.

The output unit 1F5 outputs reference material data for a work process specified by the determination by the determination unit 1F4. In addition, the output unit 1F5 is implemented by the output I/F 10H5 (FIG. 2), the monitor 11 (FIG. 2), or the like.

Further, the work instruction system 1 may have a functional configuration that further includes the recognition unit 1F6 as depicted in FIG. 11. The recognition unit 1F6 recognizes characters, numbers, a figure, a symbol, a bar code, or a two-dimensional code included in a photographic subject, the shape of a part, or a combination thereof and generates identification data DSN. In addition, the recognition unit 1F6 is implemented with the CPU 10H1 or the like.

Further, the work instruction system 1 may generate work record data DW that includes image data DImg, working time data DT, and the like.

<Conclusion>

As described above, the work instruction system 1 according to the embodiment has the following features.

The imaging unit 1F1 is configured to generate image data DImg that includes the second part P2 or the like as a photographic subject.

The obtaining unit 1F2 is configured to obtain determination data DJ in order for the camera to determine parts and the like.

The input unit 1F3 is configured to input reference material data.

The determination unit 1F4 is configured to determine, through image processing such as pattern matching, whether the photographic subject whose picture is taken by the imaging unit 1F1 matches a part indicated by the determination data DJ obtained by the obtaining unit 1F2.

When the determination unit 1F4 performs the determination, a work process to be performed is specified as in step S06 depicted in FIG. 3, and the output unit 1F5 is configured to output reference material data for the specified work process.

The work instruction system 1 obtains the determination data DJ by the obtaining unit 1F2 in advance. In the same manner, the work instruction system 1 inputs the reference material data by the input unit 1F3 in advance. Then, when a work process starts, the work instruction system 1 takes an image of a photographic subject such as the second part P2 by the imaging unit 1F1 and generates the image data DImg.

The work instruction system 1 can determine whether a correct work process or an erroneous work process is performed by comparing the determination data DJ with the photographic subject whose picture is taken. Then, if the erroneous work process is performed, the work instruction system 1 can specify that the current work process will be continuously performed so that the worker WK may correct the erroneous work process (NO in step S06 in FIG. 3). In contrast, if the correct work process is performed, the work instruction system 1 can specify that the next work process will be performed so that the worker WK may start the next work process (YES in step S06 in FIG. 3).

Accordingly, if the current work process is specified to be performed, the work instruction system 1 can output reference materials such as work instructions for the current work process. In contrast, if the next work process is specified to be performed, the work instruction system 1 can switch from the work instructions for the current work process and output work instructions for the next work process.

Accordingly, the work instruction system 1 can output reference materials such as work instructions for the work process to be performed. With the output reference materials, the work instruction system 1 is able to present the worker WK with a work instruction or points to note in the work process. In accordance with this, even if the worker WK is less experienced, the worker WK is likely to perform the work process without experiencing much difficulty.

Further, the work instruction system 1 displays the reference materials such as the work instructions on the monitor 11, for example. Accordingly, the work instruction system 1 can realize a paperless operation upon presenting the reference materials such as the work instructions.

Further, in the work instruction system 1, checking is performed by the camera 10. Accordingly, it is possible to realize a paperless operation upon performing the checking in comparison with checking where a check sheet is used. Further, in the work instruction system 1, the checking is performed by the camera 10. Accordingly, it is possible to omit an inspection process or the like where the worker WK performs checking by filling out in a check sheet, for example. In the same manner, in the work instruction system 1, the checking is performed by the camera 10. Accordingly, it is possible to omit an inspection process or the like through double checking where another worker other than the worker WK that has performed the work process performs the checking.

Further, in some cases, in order to prevent use of erroneous parts in a work process, tray serving may be performed. In such a case, only those parts to be used are arranged in cases or the like and when all the arranged parts are used, the parts are determined as all being installed. Accordingly, a work process to sort parts in the cases may be required anew in many instances. In contrast, in the embodiment, the camera 10 determines whether a part as specified in the work instructions is used, for example. Accordingly, it is possible to reduce a work process to sort parts in the cases and reduce the number of processes.

Further, in the work instruction system 1, since the camera 10 is used, the number of cables may be reduced in many instances in comparison with a system where checking is performed through connection to a tool such as an electric screwdriver. Accordingly, in system construction, the work instruction system 1 can reduce work such as wiring.

Further, in the work instruction system 1, since determination data is used, the number of types of work processes that can be checked is increased in comparison with a system where checking is performed through connection to a tool such as an electric screwdriver. Further, in the system where the checking is performed through connection to a tool such as an electric screwdriver, it is difficult in many situations to check whether an erroneous part is used. Accordingly, the work instruction system 1 can check many types of work processes.

Second Embodiment

The second embodiment is implemented with a work instruction system or the like having the same overall structure and the same hardware configuration as in the first embodiment, for example. In the following, the same overall structure and the same hardware configuration as in the first embodiment are described as an example and a repetitive description will be omitted. An overall process in the second embodiment is different from the first embodiment.

Figure 12:
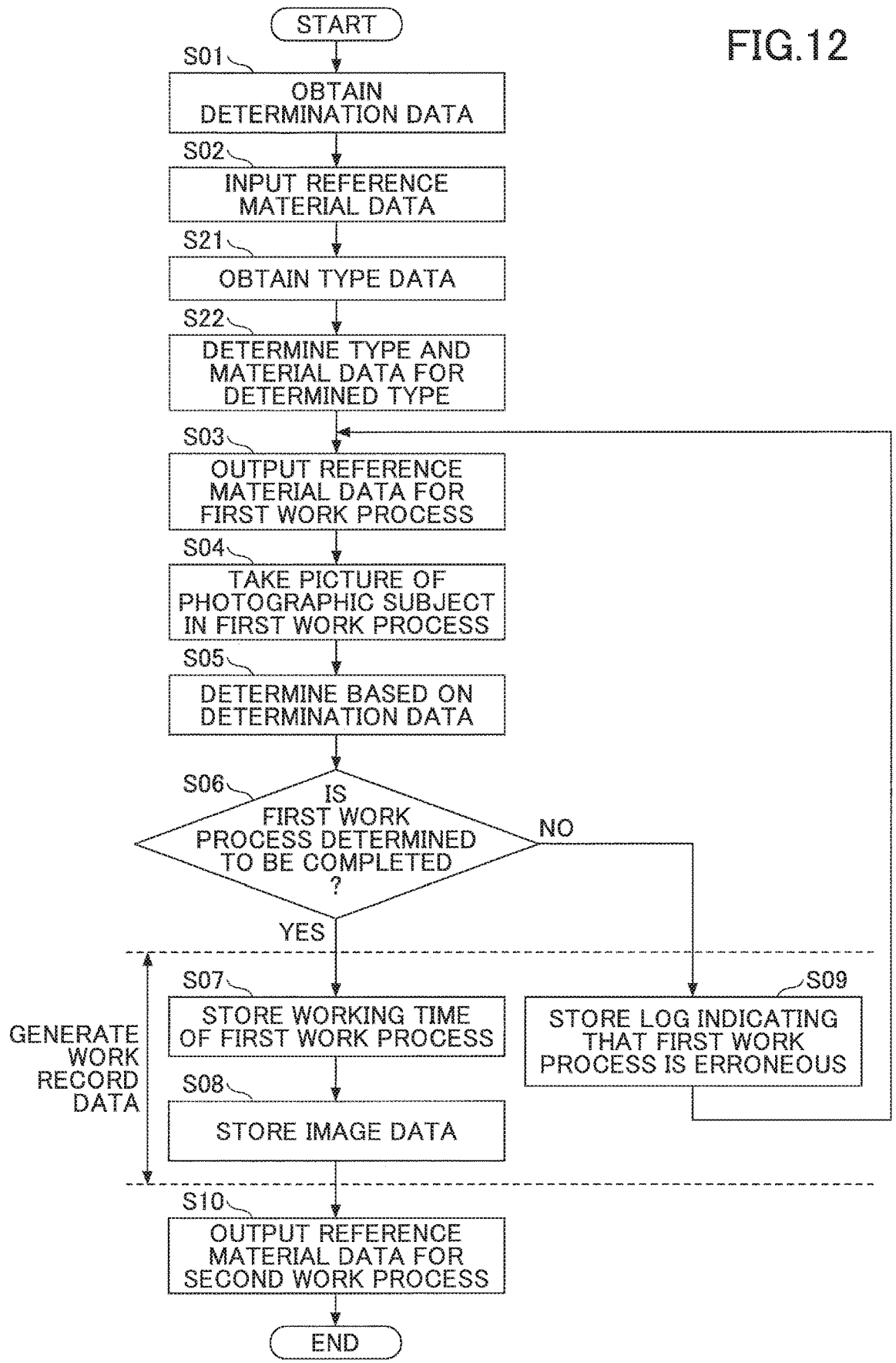
FIG. 12 is a flowchart depicting an overall process by a work instruction system according to a second embodiment.

FIG. 12 is a flowchart depicting the overall process by the work instruction system 1 according to the second embodiment. In comparison with the first embodiment, namely, the overall process depicted in FIG. 3, the overall process depicted in FIG. 12 is different in that step S21 and step S22 are added. Further, step S03 in the overall process depicted in FIG. 3 is different from step S03 in the overall process depicted in FIG. 12 in process content. In the following, different points are mainly described.

<Obtaining Type Data (Step S21)>

The camera 10 obtains type data. Kinds of a photographic subject include types of a product or the like. In the following example, the kinds of the photographic subject are the types. First, the product PD (FIG. 1) is assumed to have a plurality of types. And in many cases, the product PD is provided with characters, a symbol, numbers, characters that indicate a combination thereof (hereafter "type data"), numbers, a figure, a symbol, a bar code, a two-dimensional code, or a combination thereof (hereafter "characters") that can identify the type of the product PD. Further, the type data may be a part of a production number or the like. For example, if it is possible to specify the type from several digits from the beginning of the production number, the type data may be a beginning part of the production number. The camera 10 takes a picture of characters and obtains type data through character recognition or the like.

<Determination of Type and Reference Material Data for Determined Type (Step S22)>

The camera 10 determines the type and reference material data for the determined type. First, it is assumed that reference material data input in step S02 is generated to have the following data configuration in advance as described below.

Figure 13:
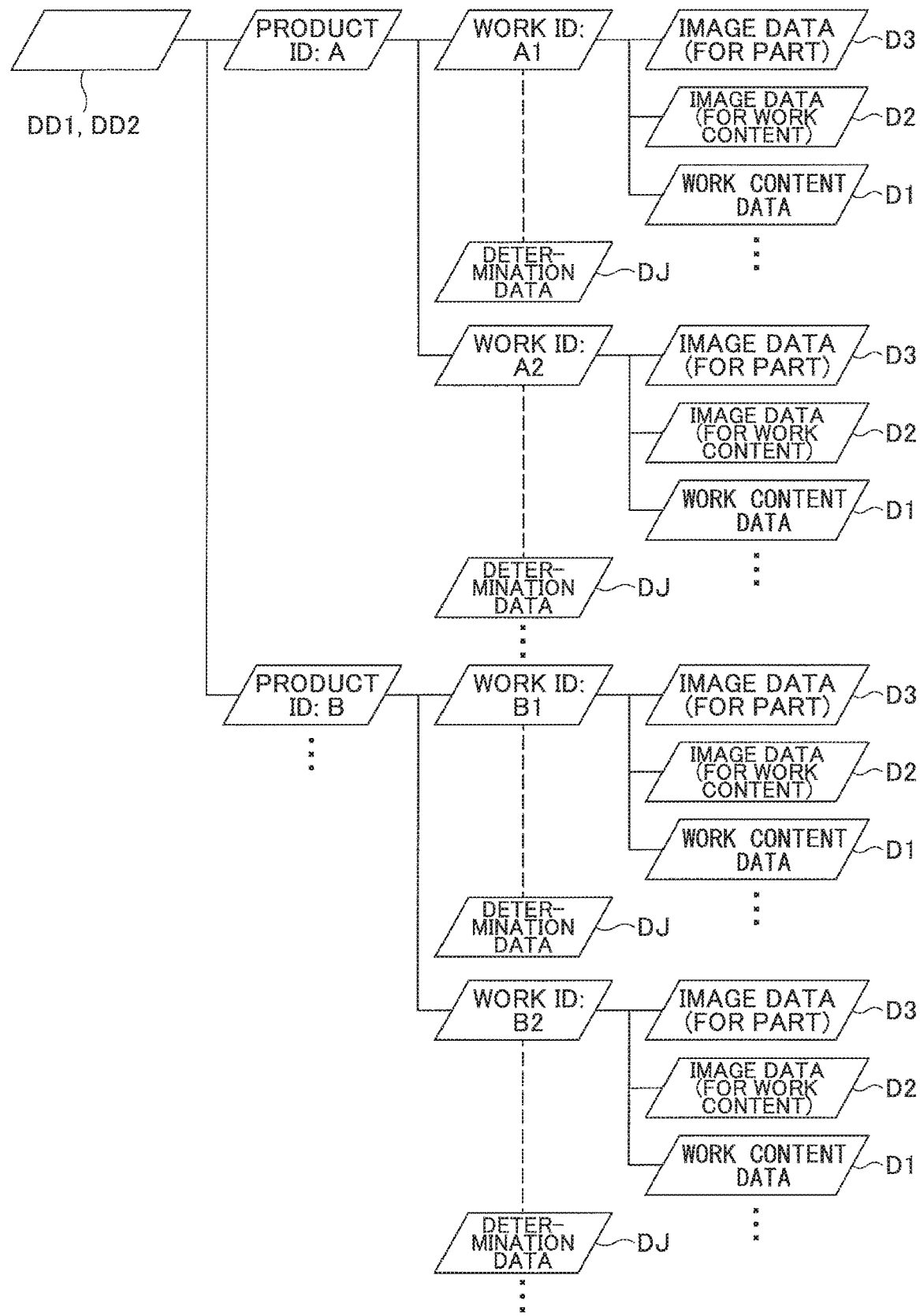
FIG. 13 is a diagram depicting a data configuration of reference material data according to the second embodiment.

FIG. 13 is a diagram depicting the data configuration of reference material data according to the second embodiment. For example, reference material data such as the first work process reference material data DD1 to be output in step S03 depicted in FIG. 12 and the second work process reference material data DD2 to be output in step S10 depicted in FIG. 12 are configured to include different reference material data depending on types as depicted in FIG. 13.

Specifically, in the example depicted in FIG. 13, types are specified with a corresponding "product ID." Further, in this example, it is assumed that the "product ID" can be specified from the type data. In other words, first, the reference material data have data about a plurality of types such as a product of a type "A" and a product of a type "B." Then, when characters such as a production number attached to the product PD are read, it is possible to specify the type of the product PD. Next, based on the specified type, the camera 10 can specify whether the product of the type "A" is a work object or the product of the type "B" is a work object, for example.

The product of each type is assumed to be assembled through a plurality of work processes. For the product of the type "A" depicted in FIG. 13, a work process whose "work ID" is "A1" and a work process whose "work ID" is "A2" are performed in the assembly.

Further, as depicted in FIG. 13, for each "work ID," namely, a work process, image data and work content data are input. In other words, for each work process, image data D3 that indicates a part or the like used to output reference material data, image data D2 that indicates an image used to describe work content, and work content data D1 that indicates characters or the like to describe the work content as depicted in FIG. 5 are input.

Further, each work process is associated with corresponding determination data DJ. In a case as depicted in FIG. 4, the determination data DJ includes image data, coordinate data, or the like. Further, in a case where determination is performed as depicted in FIG. 10, the determination data DJ may include data that indicate characters or the like written on a part. Further, the determination data DJ and the reference material data may be configured as one set of data or different sets of data.

In some cases, the same data may be used for each work process. For example, if the same part is used in work process of "A1" and "A2," the same data is used for image data D3. In such a case, one set of data may be used in common with a plurality of work processes. In this manner, it is possible to reduce the volume of reference material data.

In step S22 depicted in FIG. 12, the camera specifies a type from obtained type data. Specifically, in the case of the data configuration depicted in FIG. 13, the camera 10 specifies a "product ID" from the type data. Then, in step S22, the camera 10 determines reference material data for the specified "product ID." Specifically, in the case of the data configuration depicted in FIG. 13, the camera 10 determines reference material data for the type such as reference material data for the "product ID: A" or reference material data for the "product ID: B."

<Output of Reference Material Data for First Work Process (Step S03)>

Returning to FIG. 12, in step S03, the camera 10 outputs reference material data for the first work process. In step S03, the camera 10 outputs reference material data for the first work process for the type determined in step S22. Specifically, in the data configuration depicted in FIG. 13, if the type is determined to be "A," the camera 10 determines and outputs reference material data for the first work process among reference material data whose "work ID" is "A1," "A2," and the like.

In the overall process as in FIG. 12, the work instruction system 1 can output reference material data depending on a type or the like even if there is a plurality of types.

Third Embodiment

The third embodiment is implemented with a work instruction system or the like having the same overall structure and the same hardware configuration as in the first embodiment, for example. In the following, the same overall structure and the same hardware configuration as in the first embodiment are described as an example and a repetitive description will be omitted. An overall process in the third embodiment is different from the first embodiment.

Figure 14:
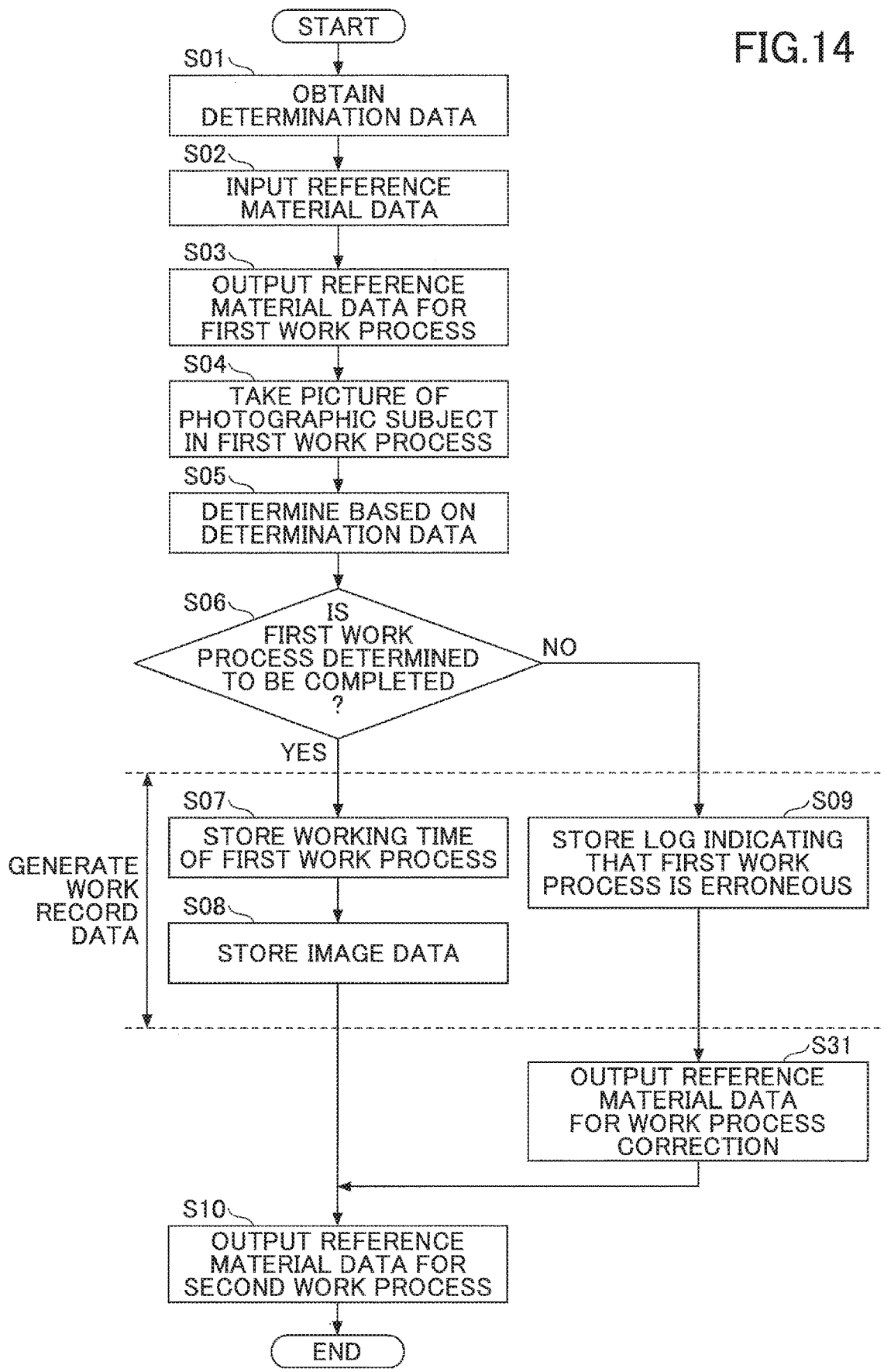
FIG. 14 is a flowchart depicting an overall process by a work instruction system according to a third embodiment.

FIG. 14 is a flowchart depicting the overall process by the work instruction system 1 according to the third embodiment. In comparison with the first embodiment, namely, the overall process depicted in FIG. 3, the overall process depicted in FIG. 14 is different in that step S31 is added. In the following, different points are mainly described.

<Output of Reference Material Data for Work Process Correction (Step S31)>

The camera 10 outputs reference material data for work process correction. In addition, the work process correction is to correct a previously performed work process and to have the same state where the product or the like has been subjected to the first work process. In other words, first, if an erroneous work process has been performed in a work process where the first work process should have been performed, the camera 10 determines that the first work process is not completed (NO in step 06). In this state, because the erroneous work process has been performed, the process for the product or the like cannot proceed to the second work process. Accordingly, after the erroneous work process, the work instruction system 1 presents the worker WK with reference material data for the work process correction and prompts the worker WK to perform the work process correction to correct the previously performed erroneous work process. In this manner, the work process correction is a work process for what is called correction of error.

When the work process correction is performed, the product or the like is in the same state where the first work process is completed. Accordingly, the process of the product or the like can proceed to the second work process in the next work process (step S10). In addition, in the work process correction, steps S04 to S09 may be performed in the same manner as in the first work process.

When the first work process is performed, an erroneous work process may be performed. In some cases, it is possible to efficiently proceed to the subsequent second work process by performing the work process correction than performing the first work process again by the worker WK. In such a case, the work instruction system 1 prompts the worker WK to perform the work process correction. In this manner, the work instruction system 1 can improve the efficiency of work processes.

Fourth Embodiment

The fourth embodiment is implemented with a work instruction system or the like having the same overall structure and the same hardware configuration as in the first embodiment, for example. In the following, the same overall structure and the same hardware configuration as in the first embodiment are described as an example and a repetitive description will be omitted. An overall process in the fourth embodiment is different from the first embodiment.

A label, a sticker, or the like (hereafter "label") indicating characters may be installed as a part on the product. For example, a part such as a label indicates a production number or the like with characters or numbers.

If there is a work process to install parts such as a plurality of labels, it is desirable to be able to check whether a part such as a label different from a part such as a label specified in the work instructions is installed in the work process. For example, parts such as labels are checked in the overall process as follows.

Figure 15:
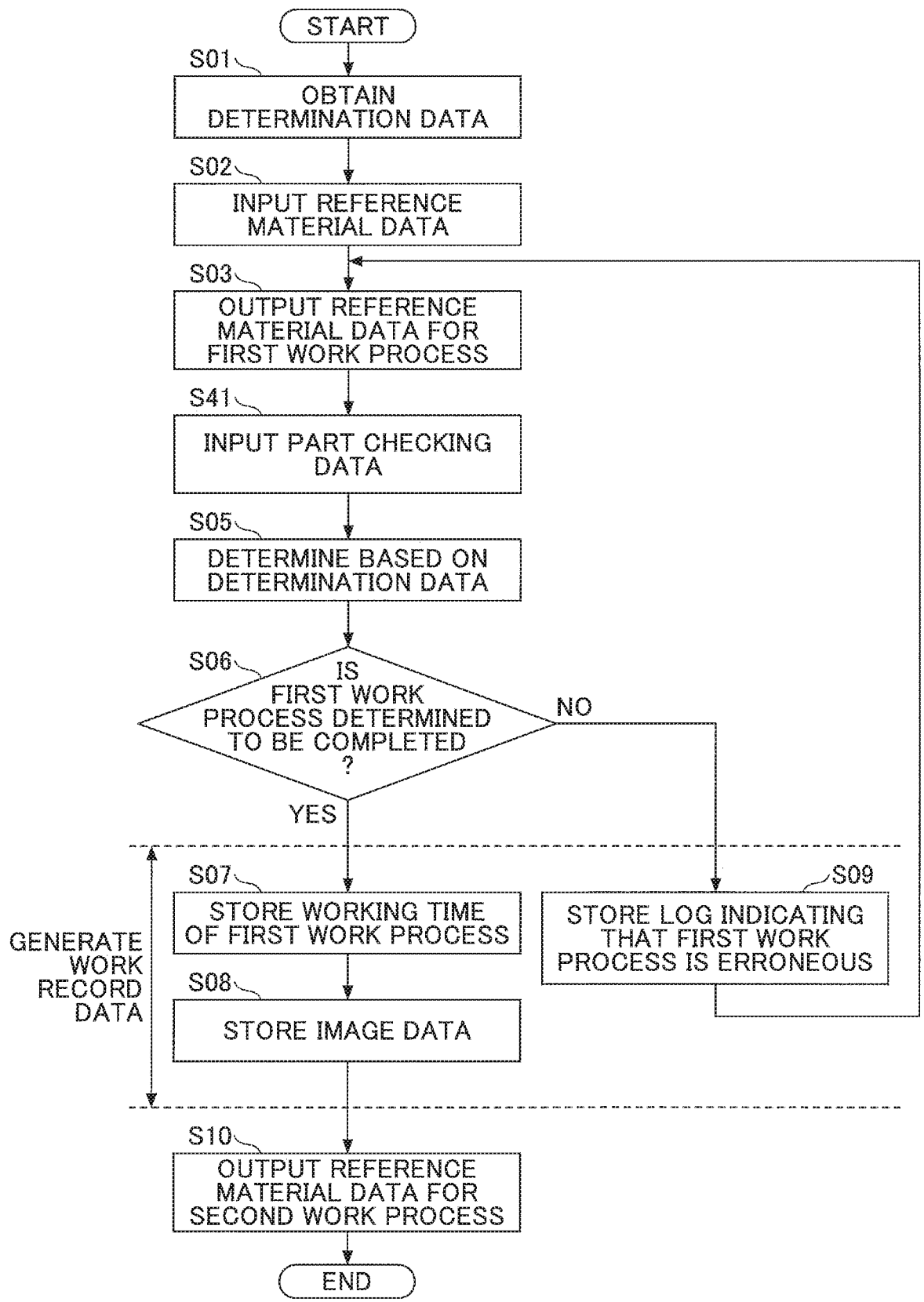
FIG. 15 is a flowchart depicting an overall process by a work instruction system according to a fourth embodiment.

FIG. 15 is a flowchart depicting the overall process by the work instruction system 1 according to the fourth embodiment. In comparison with the first embodiment, namely, the overall process depicted in FIG. 3, the overall process depicted in FIG. 15 is different in that step S04 is replaced with step S41. Further, in comparison with the overall process depicted in FIG. 3, process content of step S05 in the overall process depicted in FIG. 15 is different. In the following, different points are mainly described.

<Input of Part Checking Data (Step S41)>

The camera 10 inputs part checking data. For example, if parts such as labels indicate a production number or the like with numbers, the worker WK inputs all or part of numbers or the like written on the installed labels into the work instruction system 1 by using an input device such as a keyboard. Then the camera 10 generates the part checking data that indicates the numbers or the like input via the input device. In this manner, the part checking data includes data that indicates a production number or the like written on a part such as a label installed in a work process. In addition, the input device may be a camera. When a picture of the installed label is taken, the camera may generate part checking data by recognizing characters such as numbers included in image data generated when the picture is taken. Further, if a part such as a label indicates a bar code, for example, part checking data may be generated by being scanned by an input device such as a bar code reader.

<Determination Based on Determination Data (Step S05)>

The camera 10 performs determination based on determination data. First, numbers or the like specified in the work instructions, namely, determination data indicating numbers or the like written on a part such as a correct label is input to the camera 10 in advance. Then in step S06, the numbers indicated by the determination data input in advance are compared with numbers indicated by the part checking data.

Next, if the numbers or the like indicated by the determination data correspond to the numbers or the like indicated by the part checking data as a result of comparison, the camera 10 determines that the first work process is completed (YES in step S06) In contrast, if the numbers or the like indicated by the determination data do not correspond to the numbers or the like indicated by the part checking data as a result of comparison, the camera 10 determines that the first work process is not completed (NO in step S06).

In addition, in the determination of step S06, determination that the first work process is completed according to the first embodiment may be combined with determination that uses the part checking data. For example, as depicted in FIG. 3, step S04 according to the first embodiment is performed first and image data is generated.

The camera 10 performs determination based on the image data and determination data. Specifically, as depicted in FIG. 3, the determination based on the image data and the determination data is realized through image processing such as pattern matching.

If the numbers or the like indicated by the determination data correspond to the numbers or the like indicated by the part checking data as a result of comparison based on the part checking data and the second part P2 is taken out by the worker WK, the camera 10 determines that the first work process is completed (YES in step S06). In contrast, if the numbers or the like indicated by the determination data do not correspond to the numbers or the like indicated by the part checking data as a result of comparison based on the part checking data or the first part P1 different from the second part P2 is taken out in the first work process, the camera 10 determines that the first work process is not completed (NO in step S06). In this manner, the camera 10 may perform determination in combination of the two determination results.

In this manner, in a work process, a part such as a label that indicates numbers or the like may be installed. In such a case, it is desirable to perform an inspection to check whether a part such as a label specified in the work instructions is installed.

Whether the part such as a label specified in the work instructions is installed is determined from numbers or the like indicated by the label. In accordance with this, the work instruction system 1 can reduce a possibility of shipment in which an erroneous label is installed on a product or the like.

Fifth Embodiment

The fifth embodiment is implemented with a work instruction system or the like having the same overall structure and the same hardware configuration as in the first embodiment, for example. In the following, the same overall structure and the same hardware configuration as in the first embodiment are described as an example and a repetitive description will be omitted. In the fifth embodiment, the same overall process as in the first embodiment depicted in FIG. 3 is performed. However, process content in step S04 and step S05 is different. In the following, different points are mainly described.

For example, a document such as an operation manual or a warranty, spare parts of a product, a part such as a label to be installed on the product by a user after shipment, or a combination thereof (hereafter "enclosed items") may be enclosed with the product and shipped. In the work instruction system 1, it is desirable to perform an inspection to check the direction, the color, the shape, the number, or order of the enclosed items, or characters, a drawing, or the like written on the enclosed items. In addition, it is assumed that the direction, the color, the shape, the number, and the order of the enclosed items, or the characters, the drawing, or the like written on the enclosed items are specified in advance in the work instructions and these are included in determination data. In the following, it is assumed that a work process to package the enclosed items is performed in the first work process.

<Taking Picture of Photographic Subject in First Work Process (Step S04)>

As depicted in FIG. 3, the camera 10 takes a picture of a photographic subject on the work space WS (FIG. 1) and generates image data. In the fifth embodiment, the photographic subject includes an enclosed item. In addition, if there is a plurality of enclosed items, the worker WK uses the camera 10 to take pictures of the enclosed items in order of packaging, for example.

<Determination Based on Determination Data (Step S05)>

The camera 10 performs determination based on determination data. Specifically, the camera 10 determines whether the direction, the color, or the shape of the enclosed item indicated by image data corresponds to a direction, a color, or a shape indicated by the determination data. Further, if the enclosed item includes a document on which characters, a drawing, or the like is written, the camera 10 recognizes the characters, the drawing, or the like that is written and determines whether the characters, the drawing, or the like corresponds to characters, a drawing, or the like indicated by the determination data. In this manner, the camera 10 can check whether an enclosed item specified in the work instructions is packaged.

Further, if there is a plurality of enclosed items, the camera 10 can check order by which the enclosed items are packaged and the number of the enclosed items by checking whether the enclosed items correspond to the order of pictures of the enclosed items or all of the pictures.

In this manner, enclosed items may be packaged in the work process. In such a case, it is desirable to perform an inspection to check the direction, the color, the shape, the number, or order of the enclosed items, or characters, a drawing, or the like written on the enclosed items as specified in the work instructions.

Whether enclosed items are packaged in accordance with the direction, the color, the shape, the number, or order of the enclosed items, or characters, a drawing, or the like written on the enclosed items as specified in the work instructions is determined from image data or the like obtained by taking pictures of the enclosed items. In this manner, the work instruction system 1 can reduce a possibility of shipment in which an erroneous enclosed item is packaged.

Sixth Embodiment

The sixth embodiment is implemented with a work instruction system or the like having the same overall structure and the same hardware configuration as in the first embodiment, for example. In the following, the same overall structure and the same hardware configuration as in the first embodiment are described as an example and a repetitive description will be omitted. An overall process in the sixth embodiment is different from the overall process depicted in FIG. 3. In the following, different points are mainly described.

Figure 16:
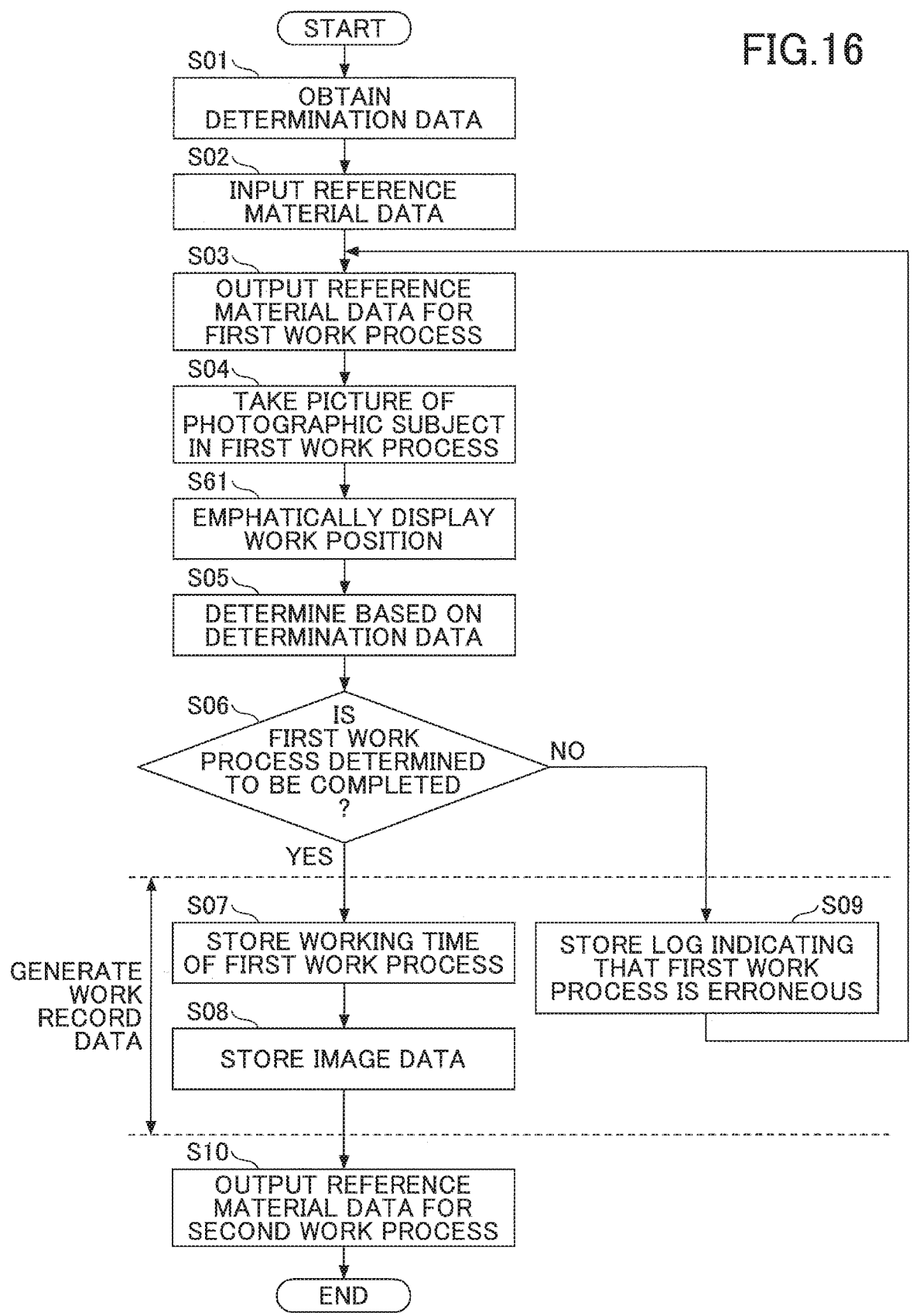
FIG. 16 is a flowchart depicting an overall process by a work instruction system according to a sixth embodiment.

FIG. 16 is a flowchart depicting the overall process by the work instruction system 1 according to the sixth embodiment. In comparison with the first embodiment, namely, the overall process depicted in FIG. 3, the overall process depicted in FIG. 16 is different in that step S61 is added.

<Emphatic Display of Work Position (Step S61)>

The camera 10 performs display to emphasize a work position. For example, the camera 10 outputs the following display to the monitor 11.

Figure 17:
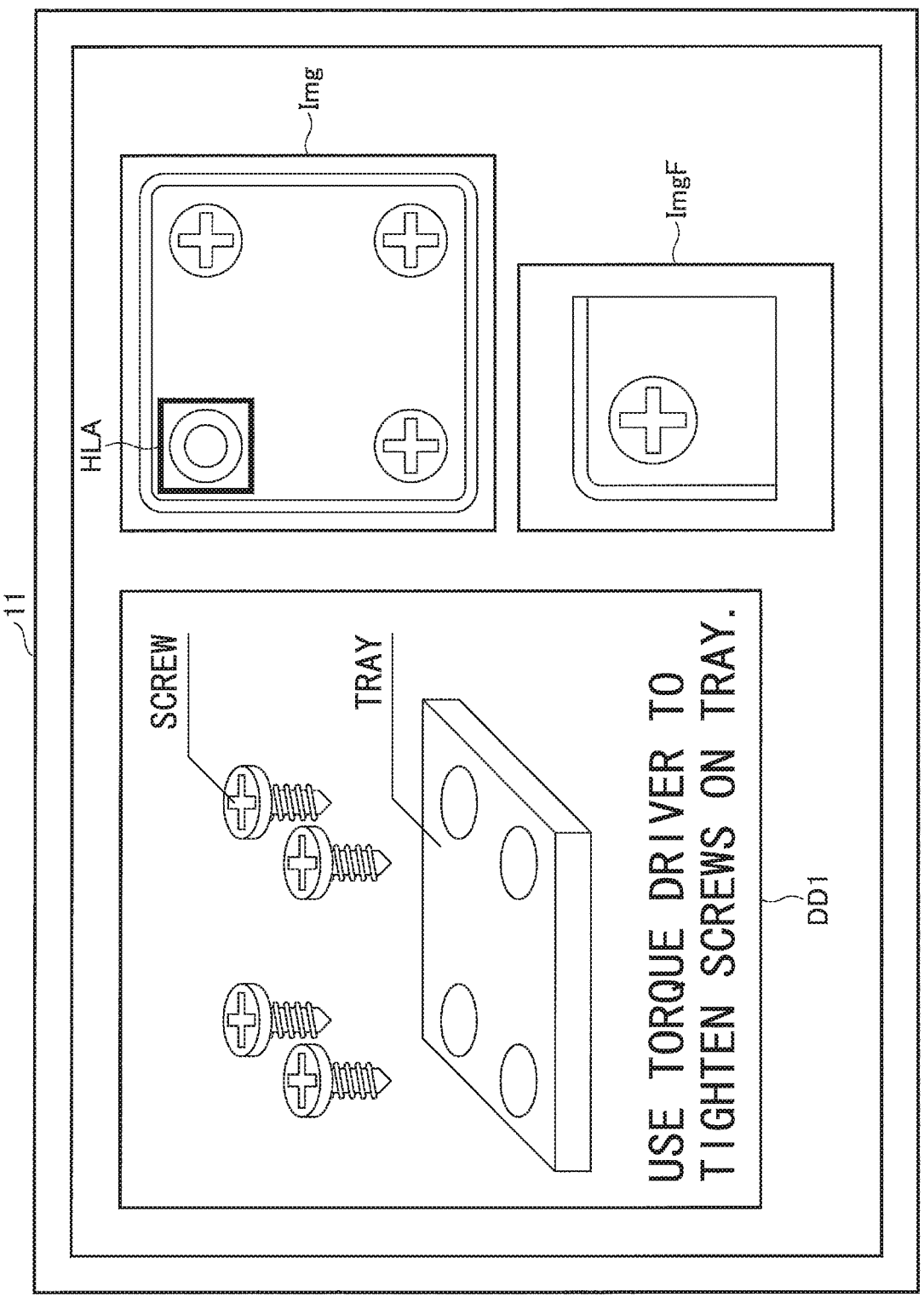
FIG. 17 is a diagram depicting display that emphasizes a work position by a work instruction system according to the sixth embodiment.

FIG. 17 is a diagram depicting display that emphasizes the work position by the work instruction system 1 according to the sixth embodiment. In the following, the first work process is to install a "screw" at four positions of a "tray" as indicated by the first work process reference material data DD1 depicted in FIG. 17. First, in step S03 depicted in FIG. 17, the first work process reference material data DD1 is displayed on the monitor 11.

On the monitor 11, a current image Img is further displayed as depicted in FIG. 17. For example, as depicted in FIG. 17, emphatic display HLA to emphasize a position to be handled as a work object (hereafter "work position") is performed on the current image Img. For example, as depicted in FIG. 17, among four work positions at which a "screw" is to be installed, if the installation of the "screw" has ended at three positions, the remaining one position (an upper left position of the current image Img depicted in FIG. 17) will be handled as a work position before the screw is installed. In such a case, the camera 10 performs the emphatic display HLA of an enclosure line in order to surround the work position with the enclosure line, for example, such that the work position is understandable in the current image Img. In addition, for the current image Img, a photographic subject such as the "tray" and the "screws" whose picture is taken in step S04 depicted in FIG. 17 is displayed. As depicted in FIG. 17, in the current image Img, the emphatic display HLA is performed on a taken image, for example.

Further, on the monitor 11, a completion drawing ImgF or the like may be displayed. As depicted in FIG. 17, the completion drawing ImgF includes an image that indicates what kind of state of the work position specified with the emphatic display HLA will be determined by the camera 10 that the first work process is completed. In other words, if the worker WK puts the work position specified with the emphatic display HLA into the state as shown in the completion drawing ImgF, the first work process is completed. In FIG. 17, when a "screw" is installed at the work position, the work position is in the state as shown in the completion drawing ImgF and the first work process is completed.

In addition, the emphatic display HLA is not limited to display to surround with an enclosure line as depicted in FIG. 17. For example, the emphatic display HLA may enlarge or flash a work position, or gray out positions other than the work position.

When the work instruction system 1 outputs the work position emphatically in this manner, the worker WK is likely to understand where the work position is. In particular, as depicted in FIG. 17, if the emphatic display HLA is output on the current image Img together with the first work process reference material data DD1, the worker WK can readily make a comparison with the first work process reference material data DD1 and work content becomes understandable.

In addition, all or part of each process in the present invention may be realized by a program for causing a computer to execute the process, the program being described in a legacy programming language such as assembler, C, C++, C#, Java (registered trademark), or the like. In addition, the programming language may be an object-oriented programming language or the like. In other words, the program includes a computer program for causing a computer to execute each process, the computer being used for an information processing device, an information processing system, or the like including the information processing device.

Further, the program may be distributed after being stored in a computer-readable recording medium such as a ROM or an Electrically Erasable Programmable ROM (EEPROM), for example. Further, the recording medium may be an Erasable Programmable ROM (EPROM), a flash memory, a flexible disk, an optical disk such as a CD-RON, an SD (registered trademark) card, an MO, or the like as long as an electronic medium is used. Further, the program may be distributed through an electric communication line.

Further, the information processing system may include two information processing devices or more connected to one another via a network, in which all or part of various types of processes may be performed by the information processing devices in a dispersed, parallel, or redundant manner.

Although preferable examples of the present invention are described in detail, the present invention is not limited to a specific embodiment but various types of variations or modifications are possible without departing from the scope of the present invention as claimed in the claims.

According to one aspect of an embodiment of the present invention, it is possible to output reference materials such as work instructions for a work process to be performed.

According to another aspect of an embodiment of the present invention, there is provided an information processing method performed by a system for outputting a work instruction, in which an image processing device that takes a picture of a photographic subject is connected to an output device, the method including:

generating image data showing the picture of the photographic subject;

obtaining determination data used for determination of whether a work process performed on the photographic subject is completed;

inputting reference material data that indicates reference materials used for reference in the work process;

determining whether the work process performed on the photographic subject is completed, the determination being made depending on whether the photographic subject in the image data is in a state indicated by the determination data; and outputting, to the output device, reference material data for a work process specified in accordance with the determination.

According to another aspect of an embodiment of the present invention, there is provided a non-transitory computer-readable storage medium storing a computer-readable program that, when executed by a computer in which an image processing device that takes a picture of a photographic subject is connected to an output device, causes the computer to perform a process, the process including: generating image data showing the picture of the photographic subject;

obtaining determination data used for determination of whether a work process performed on the photographic subject is completed;

inputting reference material data that indicates reference materials used for reference in the work process;

determining whether the work process performed on the photographic subject is completed, the determination being made depending on whether the photographic subject in the image data is in a state indicated by the determination data; and outputting, to the output device, reference material data for a work process specified in accordance with the determination.

Further, the present invention is not limited to these embodiments, and various variations and modifications may be made without departing from the scope of the present invention.

What is claimed is:

1. A system for outputting a work instruction, in which an image processing device that takes a picture of a photographic subject is connected to output circuitry, the system comprising:
   an optical sensor configured to generate image data showing the picture of the photographic subject;
   interface circuitry configured to obtain determination data used for determination of whether a work process performed on the photographic subject is completed, and reference material data indicating reference materials used for reference in the work process; and
   processing circuitry configured to determine whether the work process performed on the photographic subject is completed, the determination being made depending on whether the photographic subject in the image data is in a state indicated by the determination data, and output, to the output circuitry, reference material data for a work process specified in accordance with the determination,
   wherein the processing circuitry is further configured to
   output a first image in which a particular region to be handled as a work object in the work process is displayed with emphasis so as to be distinguished from other regions in the first image, in accordance with a determination result of the processing circuitry, wherein the first image in which the particular region to be handled as the work object is displayed with emphasis includes a plurality of regions that are adjacent to each other, require respective works that correspond to each other, and include a region for which a work is completed and a region for which a work is not completed, and
   output a second image indicating a desired state of the particular region, which is displayed with emphasis in the first image, when the work process is completed, wherein the second image indicates, in a manner of being able to be compared with the plurality of regions of the first image, the desired state of the particular region, which is displayed with emphasis in the first image, occurring when the work for the particular region is completed.

2. The system for outputting a work instruction as claimed in claim 1, wherein the photographic subject shown in the image data generated by the imaging sensor includes a product on which a part is installed in the work process or the part that constitutes the product.

3. The system for outputting a work instruction as claimed in claim 2, wherein the determination data obtained by the interface circuitry includes at least one of a color, a type, a shape of the product or the part, a number of parts to be installed on the product and in the work process, and a position of the product at which the part is to be installed in the work process.

4. The system for outputting a work instruction as claimed in claim 2, wherein the reference material data output by the processing circuitry includes at least one of work instructions for the work process, work content of the work process, an image that indicates the product or the part to be used in the work process, an image that indicates a state where the part is installed on the product, and a work order by which the work process is performed.

5. The system for outputting a work instruction as claimed in claim 4, wherein the processing circuitry is further configured to determine whether the work process corresponds to a work process specified in the work instructions.

6. The system for outputting a work instruction as claimed in claim 1, wherein the processing circuitry is further configured to recognize at least one of characters, numbers, a figure, a symbol, a bar code, a two-dimensional code included in the photographic subject, and a shape of the photographic subject, wherein identification data for identifying the photographic subject is determined in accordance with the recognition and the identification data is stored in association with the work process.

7. The system for outputting a work instruction as claimed in claim 6, wherein the identification data includes a serial number, a production number, or an ID.

8. The system for outputting a work instruction as claimed in claim 1, wherein work record data including a working time during which the work process is performed is generated.

9. The system for outputting a work instruction as claimed in claim 8, wherein the working time is a time duration during which the work process is performed.

10. The system for outputting a work instruction as claimed in claim 1, wherein when a plurality of parts including a first part and a second part are used in the work process, the processing circuitry is further configured to perform the determination based on at least one of whether the first part and the second part are installed, an order by which the first part and the second part are installed, and positions at which the first part and the second part are installed.

11. The system for outputting a work instruction as claimed in claim 1, wherein when it is determined that a work process specified in work instructions is completed, the processing circuitry is further configured to output, to the output circuitry, reference material data for a subsequent work process that follows the completed work process.

12. The system for outputting a work instruction as claimed in claim 1, wherein a type of the photographic subject is determined, reference material data for the determined type is input, and the reference material data is output, to the output circuitry, based on the determined type.

13. The system for outputting a work instruction as claimed in claim 1, wherein based on the determination, the processing circuitry is further configured to output, to the output circuitry, reference material data for a work process correction to correct a previously performed work process.

14. The system for outputting a work instruction as claimed in claim 1, wherein the processing circuitry is further configured to determine, based on the determination data, at least one of a direction, a color, a shape, a number, an order of the photographic subject, characters, and a drawing written on the photographic subject.

15. A system for outputting a work instruction, in which an image processing device that takes a picture of a photographic subject is connected to output circuitry, the system comprising:
   interface circuitry configured to obtain part checking data, the part checking data indicating a part to be installed on the photographic subject, determination data used for determination of whether a work process performed on the photographic subject is completed, and reference material data indicating reference materials used for reference in the work process;
   processing circuitry is further configured to determine whether the work process performed on the photographic subject is completed, the determination being made depending on whether the photographic subject includes an object indicated by the part checking data and the determination data, and output, to the output circuitry, reference material data for a work process specified in accordance with the determination, wherein the processing circuitry is further configured to output a first image in which a particular region to be handled as a work object in the work process is displayed with emphasis so as to be distinguished from other regions in the first image, in accordance with a determination result of the processing circuitry, wherein the first image in which the particular region to be handled as the work object is displayed with emphasis includes a plurality of regions that are adjacent to each other, require respective works that correspond to each other, and include a region for which a work is completed and a region for which a work is not completed, and output a second image indicating a desired state of the particular region, which is displayed with emphasis in the first image, when the work process is completed, wherein the second image indicates, in a manner of being able to be compared with the plurality of regions of the first image, the desired state of the particular region, which is displayed with emphasis in the first image, occurring when the work for the particular region is completed.

16. The system for outputting a work instruction as claimed in claim 15, wherein work record data including a working time duration during which the work process is performed is generated.

17. An image processing apparatus for taking a picture of a photographic subject, the image processing apparatus comprising:

an optical sensor configured to generate image data showing the picture of the photographic subject;

interface circuitry configured to obtain determination data used for determination of whether a work process performed on the photographic subject is completed, and reference material data indicating reference materials used for reference in the work process;

processing circuitry is further configured to determine whether the work process performed on the photographic subject is completed, the determination being made depending on whether the photographic subject in the image data is in a state indicated by the determination data, and output reference material data for a work process specified in accordance with the determination, wherein the processing circuitry is further configured to output a first image in which a particular region to be handled as a work object in the work process is displayed with emphasis so as to be distinguished from other regions in the first image, in accordance with a determination result of the processing circuitry, wherein the first image in which the particular region to be handled as the work object is displayed with emphasis includes a plurality of regions that are adjacent to each other, require respective works that correspond to each other, and include a region for which a work is completed and a region for which a work is not completed, and output a second image indicating a desired state of the particular region, which is displayed with emphasis in the first image, when the work process is completed, wherein the second image indicates, in a manner of being able to be compared with the plurality of regions of the first image, the desired state of the particular region, which is displayed with emphasis in the first image, occurring when the work for the particular region is completed.

18. The image processing apparatus as claimed in claim 17, wherein work record data including a working time duration during which the work process is performed is generated.

* * * * *